United States Patent
Yoshima et al.

(10) Patent No.: US 10,862,092 B2
(45) Date of Patent: Dec. 8, 2020

(54) SECONDARY BATTERY WITH SEPARATOR HAVING A SOLID ELECTROLYTE, BATTERY PACK, AND VEHICLE

(71) Applicant: KABUSHIKI KAISHA TOSHIBA, Minato-ku (JP)

(72) Inventors: Kazuomi Yoshima, Yokohama (JP); Norio Takami, Yokohama (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 104 days.

(21) Appl. No.: 15/701,888

(22) Filed: Sep. 12, 2017

(65) Prior Publication Data
US 2018/0277813 A1    Sep. 27, 2018

(30) Foreign Application Priority Data

Mar. 21, 2017 (JP) ................................. 2017-054676
Sep. 7, 2017 (JP) ................................. 2017-172177

(51) Int. Cl.
| | |
|---|---|
| *H01M 2/16* | (2006.01) |
| *H01M 2/14* | (2006.01) |
| *H01M 2/10* | (2006.01) |
| *H01M 10/24* | (2006.01) |
| *H01M 10/42* | (2006.01) |

(52) U.S. Cl.
CPC ....... *H01M 2/1646* (2013.01); *H01M 2/1077* (2013.01); *H01M 2/14* (2013.01); *H01M 2/145* (2013.01); *H01M 2/1653* (2013.01); *H01M 10/24* (2013.01); *H01M 10/425* (2013.01); *H01M 2220/20* (2013.01); *H01M 2300/0002* (2013.01)

(58) Field of Classification Search
None
See application file for complete search history.

(56) References Cited

U.S. PATENT DOCUMENTS

| | | | |
|---|---|---|---|
| 5,798,189 A * | 8/1998 | Hayashida | H01M 2/162 429/101 |
| 6,403,253 B1 | 6/2002 | Wainwright et al. | |

(Continued)

FOREIGN PATENT DOCUMENTS

| | | |
|---|---|---|
| JP | 9-508490 A | 8/1997 |
| JP | 2000-77073 A | 3/2000 |

(Continued)

OTHER PUBLICATIONS

S. Liu, et al., "Rechargeable Aqueous Lithium-Ion Battery of $TiO_2/LiMn_2O_4$ with a High Voltage" Journal of The Electrochemical Society, vol. 158, No. 12, 2011, pp. A1490-A1497.

*Primary Examiner* — Ula C Ruddock
*Assistant Examiner* — Tony S Chuo
(74) *Attorney, Agent, or Firm* — Oblon, McClelland, Maier & Neustadt, L.L.P.

(57) ABSTRACT

According to one embodiment, a separator is provided. The separator is selectively permeable to monovalent cations and includes a first surface and a second surface which is a reverse surface to the first surface. A contact angle θ1 of the first surface with respect to an aqueous electrolyte is different from a contact angle θ2 of the second surface with respect to the aqueous electrolyte.

16 Claims, 9 Drawing Sheets

(56) References Cited

U.S. PATENT DOCUMENTS

| | | | |
|---|---|---|---|
| 2002/0053511 A1 | 5/2002 | Sugaya et al. | |
| 2002/0121396 A1* | 9/2002 | Ovshinsky | B60K 6/24 |
| | | | 180/65.245 |
| 2005/0158632 A1* | 7/2005 | Wang Chen | H01G 9/02 |
| | | | 429/309 |
| 2009/0134842 A1* | 5/2009 | Joshi | H01M 2/1646 |
| | | | 320/127 |
| 2010/0136427 A1* | 6/2010 | Kondo | H01M 4/485 |
| | | | 429/207 |
| 2011/0065009 A1* | 3/2011 | Lascaud | H01M 4/0445 |
| | | | 429/405 |
| 2012/0208062 A1 | 8/2012 | Zhou et al. | |
| 2012/0328958 A1 | 12/2012 | Jeong et al. | |
| 2014/0370399 A1 | 12/2014 | Suzuki | |
| 2015/0280216 A1* | 10/2015 | Sumiyama | H01M 2/162 |
| | | | 429/156 |
| 2017/0271682 A1 | 9/2017 | Matsuno et al. | |
| 2017/0271717 A1 | 9/2017 | Yamashita et al. | |

FOREIGN PATENT DOCUMENTS

| | | |
|---|---|---|
| JP | 2001-206964 A | 7/2001 |
| JP | 2003-17057 A | 1/2003 |
| JP | 2005-71807 A | 3/2005 |
| JP | 2007-513464 A | 5/2007 |
| JP | 4399779 B2 | 1/2010 |
| JP | 2010-56026 A | 3/2010 |
| JP | 5414075 B2 | 2/2014 |
| JP | 2015-95431 A | 5/2015 |
| JP | 2017-33895 A | 2/2017 |
| JP | 2017-124951 A | 7/2017 |
| JP | 2017-174809 A | 9/2017 |
| JP | 2017-174810 A | 9/2017 |
| WO | WO 2016/114141 A1 | 7/2016 |
| WO | WO 2017/135323 A1 | 8/2017 |

* cited by examiner

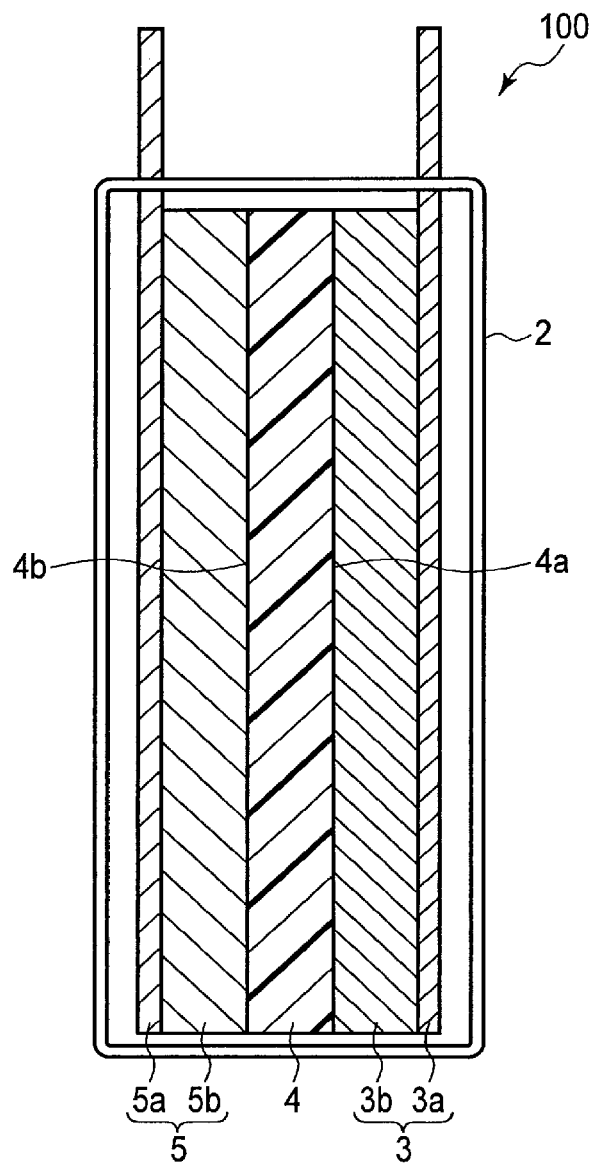
F I G. 1

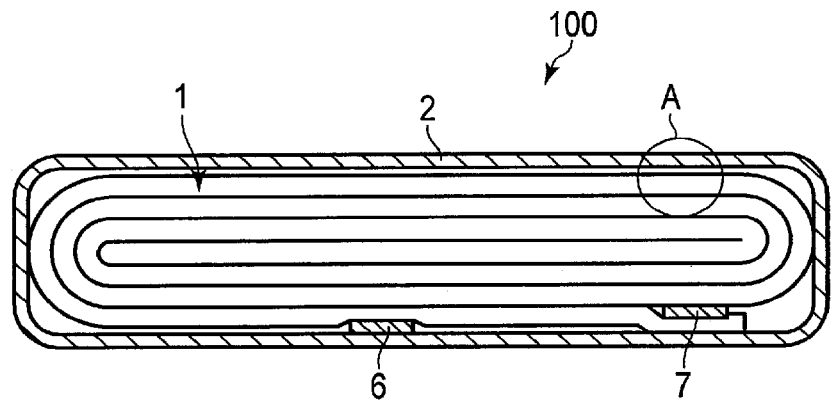
F I G. 2
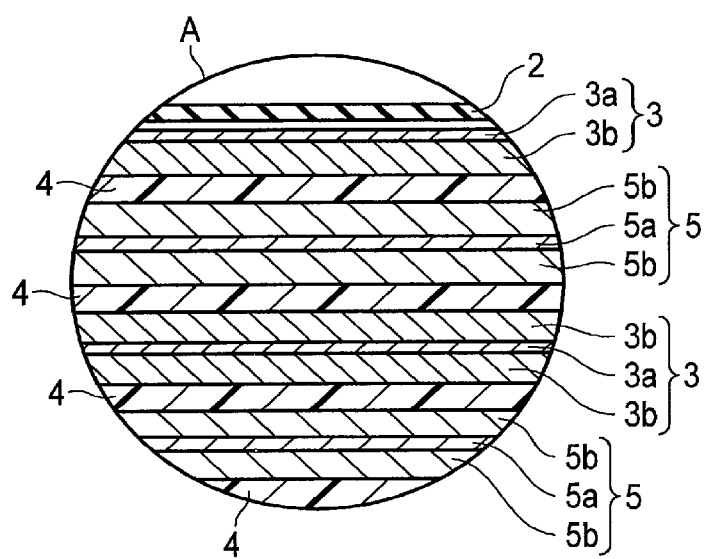
F I G. 3

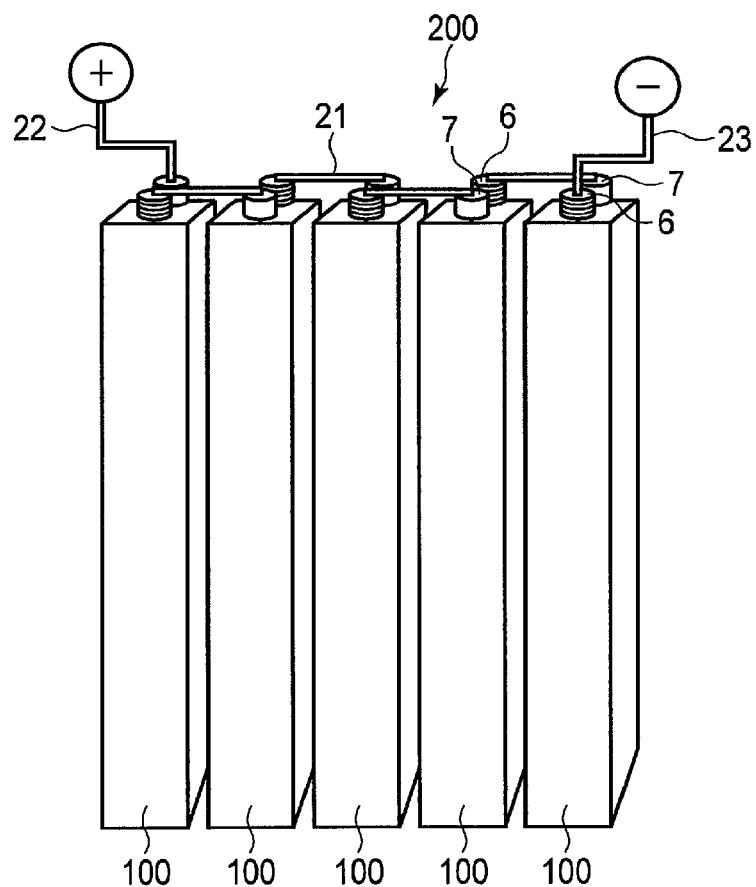
F I G. 6

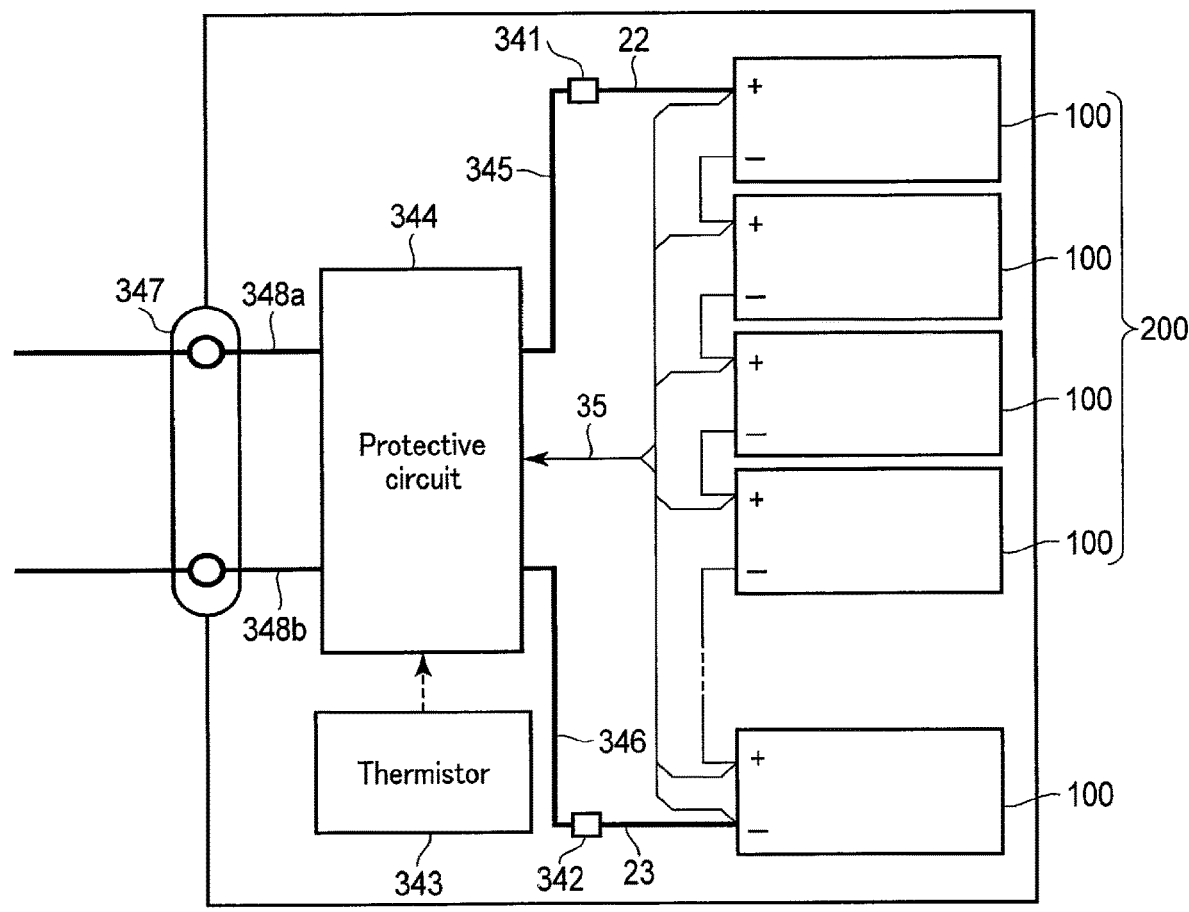
F I G. 8
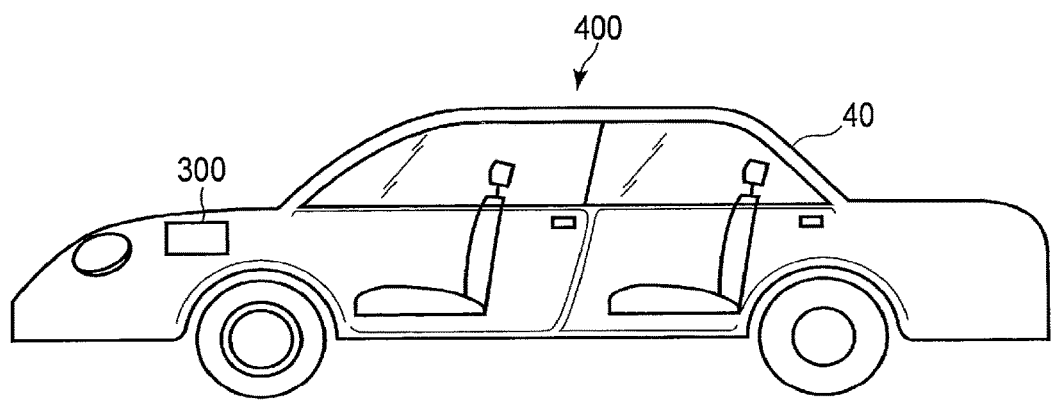
F I G. 9

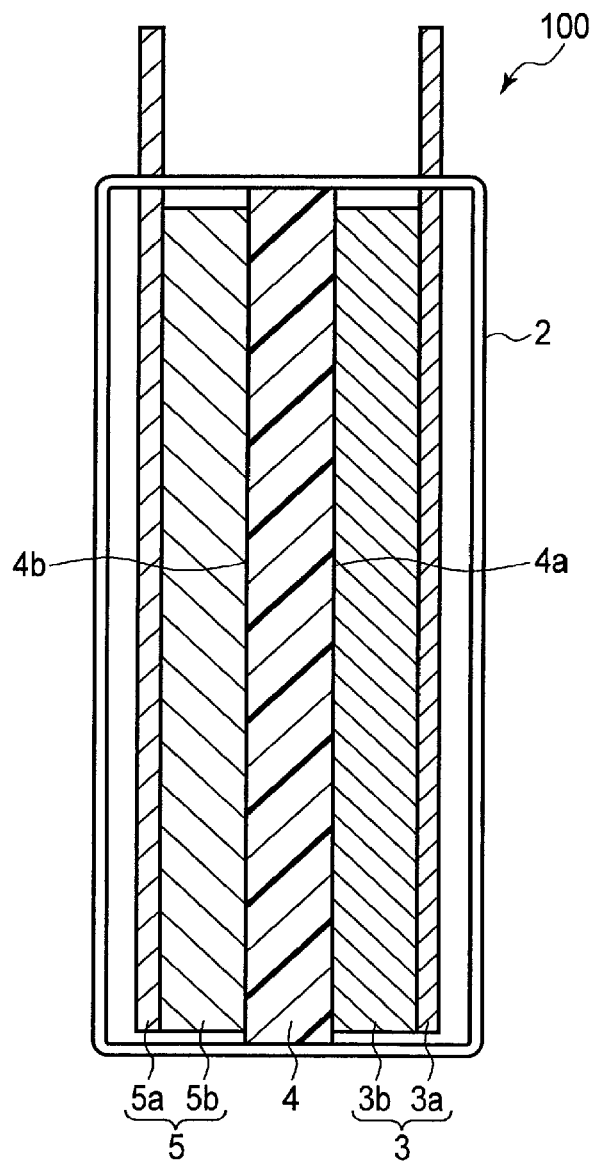
F I G. 11

SECONDARY BATTERY WITH SEPARATOR HAVING A SOLID ELECTROLYTE, BATTERY PACK, AND VEHICLE

CROSS-REFERENCE TO RELATED APPLICATION

This application is based upon and claims the benefit of priority from prior Japanese Patent Application No. 2017-054676, filed Mar. 21, 2017; and No. 2017-172177, filed Sep. 7, 2017, the entire contents of which are incorporated herein by reference.

FIELD

Embodiments described herein relate generally to a separator, a secondary battery, a battery pack, and a vehicle.

BACKGROUND

A nonaqueous electrolyte battery, particularly, a lithium secondary battery using a carbon material or lithium titanium oxide as a negative electrode active material and a layered oxide containing nickel, cobalt, and manganese as positive electrode active materials has already been put into practical use as a power supply in a broad field. The form of such a nonaqueous electrolyte battery widely ranges from a small battery for various kinds of electronic devices to a large battery for an electric automobile. These lithium secondary batteries use, as the electrolytic solution, a nonaqueous organic solvent containing ethylene carbonate or methyl ethyl carbonate, unlike a nickel hydrogen battery or a lead storage battery. Electrolytic solutions using these solvents have high resistance to oxidation and high resistance to reduction as compared to an aqueous electrolyte solution, and electrolysis of the solvents hardly occurs. For this reason, a nonaqueous lithium secondary battery can implement a high electromotive force of 2 to 4.5 V.

On the other hand, since many organic solvents are combustible, the safety of a secondary battery using an organic solvent readily becomes lower than that of a secondary battery using an aqueous solution in principle. Although various measures are taken to improve the safety of a lithium secondary battery using an electrolytic solution containing an organic solvent, they are not necessarily enough. In addition, a nonaqueous lithium secondary battery requires a dry environment in its manufacturing process, and the manufacturing cost inevitably rises. Furthermore, since an electrolytic solution containing an organic solvent is poor in conductivity, the internal resistance of the nonaqueous lithium secondary battery readily becomes high. These problems are great disadvantages for a large storage battery used in an electronic automobile, a hybrid electronic automobile, or an electric power storage for which the battery safety and the battery cost are of importance.

In order to solve these problems, studies have been made to change a nonaqueous electrolytic solution into an aqueous solution. In an aqueous electrolytic solution, a potential range in which charge and discharge of a battery are executed needs to be limited to a potential range in which an electrolysis reaction of water contained as a solvent does not occur. For example, when lithium manganese oxide is used as a positive electrode active material, and lithium vanadium oxide is used as a negative electrode active material, electrolysis of water can be avoided. With the combination of these materials, an electromotive force of about 1 to 1.5 V is obtained. However, a sufficient energy density as a battery can hardly be obtained.

When lithium-manganese oxides are used as the positive electrode active material and lithium-titanium oxides such as $LiTi_2O_4$, $Li_4Ti_5O_{12}$, or the like are used as the negative electrode active material, an electromotive force of about 2.6 to 2.7 V is theoretically obtained, and it may be an attractive battery from the viewpoint of energy density. A nonaqueous lithium secondary battery employing such a combination of positive and negative electrode materials has the excellent life time performance, and such a battery has already been put to practical use. However, in an aqueous electrolytic solution, since the potential of lithium insertion/extraction of lithium-titanium oxides is about 1.5 V (vs. $Li/Li^+$) based on lithium potential, the electrolysis of water easily occurs. On the other hand, even in the lithium Mn oxide of the positive electrode, there was a problem that the oxidation of the cations in the aqueous solution occurred and gas was generated, and satisfactory charge-and-discharge was impossible.

BRIEF DESCRIPTION OF THE DRAWINGS

FIG. 1 is a plan view schematically showing one example of secondary batteries according to a first embodiment;

FIG. 2 is a cross-sectional view schematically showing another example of the secondary batteries according to the first embodiment;

FIG. 3 is an enlarged cross-sectional view showing a part A in FIG. 2;

FIG. 6 is a perspective view schematically showing one example of battery modules according to the first embodiment;

FIG. 8 is a block diagram showing one example of electric circuits of the battery pack shown in FIG. 7;

FIG. 9 is a cross-sectional view schematically showing one example of a vehicle according to a third embodiment;

FIG. 11 is a plan view schematically showing another example of the secondary batteries according to the first embodiment.

DETAILED DESCRIPTION

Figure 4:
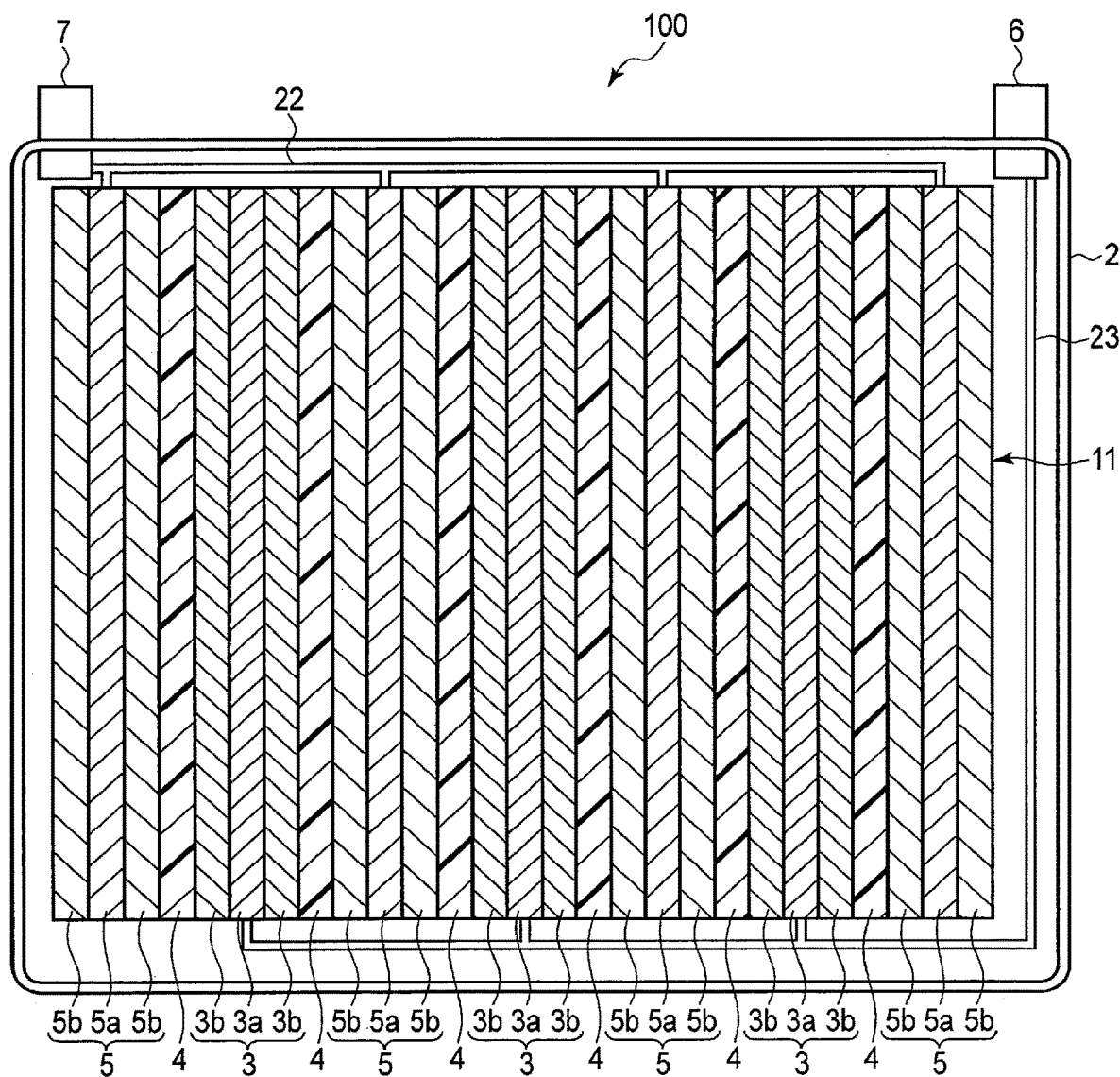
FIG. 4 is a plan view schematically showing another example of the secondary batteries according to the first embodiment.

According to an embodiment, a separator is provided. The separator is selectively permeable to monovalent cations and includes a first surface and a second surface which is a reverse surface to the first surface. A contact angle θ1 of the first surface with respect to an aqueous electrolyte is different from a contact angle θ2 of the second surface with respect to the aqueous electrolyte.

According to an embodiment, a secondary battery is provided. The secondary battery includes a positive electrode, a negative electrode including a negative electrode active material-containing layer, an aqueous electrolyte, and a separator selectively permeable to monovalent cations.

The separator includes a first principal surface facing the negative electrode active material-containing layer and a second principal surface. A contact angle θ1 of the first principal surface with respect to the aqueous electrolyte is 90°≤θ1<180°.

According to an embodiment, a battery back is provided. The battery pack includes the secondary battery according to the first embodiment.

According to an embodiment, a vehicle is provided. The vehicle includes the battery pack according to the second embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a secondary battery is provided. The secondary battery includes a positive electrode, a negative electrode including a negative electrode active material-containing layer, an aqueous electrolyte, and a separator selectively permeable to monovalent cations. The separator includes a first principal surface facing the negative electrode active material-containing layer and a second principal surface. A contact angle θ1 of the first principal surface with respect to the aqueous electrolyte is 90°≤θ1<180°.

In the negative electrode of the secondary battery including the aqueous electrolyte, electrolysis of water tends to occur due to low hydrogen overvoltage. The electrolysis of water is represented by Formula 1 below.

$$2H_2O \rightarrow H_2 + 2OH^-  \quad (1)$$

That is, when the electrolysis of water occurs, pH in the vicinity of the negative electrode is increased because hydrogen gas is generated in the vicinity of the negative electrode and $OH^-$ is generated.

The inventors of the present application found that locally decreasing the amount of water molecules in the vicinity of the negative electrode makes it difficult for the reaction of Formula (1) to proceed to the right, and as a result, charge-and-discharge property and cycle life performance could be improved.

In order to locally reduce the amount of water molecules in the vicinity of the negative electrode, separator selectively permeable to monovalent cations is used. Of a first principal surface and a second principal surface of the separator, a contact angle θ1 with respect to an aqueous electrolyte is equal to or greater than 90° and less than 180° on the first principal surface facing a negative electrode active material-containing layer. By doing so, when the electrolysis of water progresses in the vicinity of the negative electrode (negative electrode active material-containing layer), the separator is hard to be permeable to water molecules. Thus, the amount of water molecules in the vicinity of the negative electrode remains small. On the other hand, since the separator is not permeable to anions, hydroxide ions generated by the electrolysis of water tend to remain near the negative electrode. As a result, the electrolysis of water represented by Formula (1) hardly proceeds to the right. Even if a small amount of electrolyte is present between the negative electrode and the separator, charge and discharge can be sufficiently performed.

When the electrolysis of water occurs, the charge efficiency is reduced and the charge capacity becomes excessive. Thus, the charge-and-discharge efficiency (ratio of a discharge capacity to a charge capacity) is low. However, when the electrolysis of water hardly occurs by virtue of the secondary battery according to the embodiment, over-charge can be suppressed, thereby achieving the excellent charge-and-discharge efficiency.

In addition, when the electrolysis of water occurs in the negative electrode, the charge-and-discharge efficiency of the negative electrode becomes lower than the charge-and-discharge efficiency of the positive electrode. Therefore, by repeating the charge-and-discharge cycle, the positive electrode gradually becomes over-charged and the positive electrode is deteriorated at an early stage. However, if the electrolysis of water can be suppressed, the positive electrode is hardly deteriorated, thereby improving cycle life performance of the secondary battery.

As described above, the secondary battery according to the embodiment can achieve the excellent charge-and-discharge property and the excellent cycle life performance.

The secondary battery may further include a container member in which the positive electrode, the negative electrode, the aqueous electrolyte, and the separator are housed, in addition to the positive electrode, the negative electrode, the aqueous electrolyte, and the separator.

Hereinafter, the separator, the aqueous electrolyte, the negative electrode, the positive electrode, and the container member will be described.

(1) Separator

The separator is selectively permeable to monovalent cations and includes a first surface and a second surface which is a reverse surface to the first surface. A contact angle θ1 of the first surface with respect to an aqueous electrolyte is different from a contact angle θ2 of the second surface with respect to the aqueous electrolyte. The separator is used for, for example, a secondary battery including a positive electrode, a negative electrode, and the aqueous electrolyte.

The separator may have a first principal surface corresponding to the first surface and a second principal surface corresponding to the second surface. In this case, the separator has, for example, a sheet shape.

The separator is disposed between the positive electrode and the negative electrode described below. The separator is provided for preventing contact between the positive electrode and the negative electrode and is formed from a material having electrically insulating properties.

The separator can be selectively permeable to monovalent cations. That is, the separator is not permeable to divalent cations, higher-valent cations, and anions among a plurality of ions contained in the aqueous electrolyte described below. Examples of the monovalent cations include lithium ions and sodium ions.

The confirmation as to whether the separator is selectively permeable to the monovalent cations can be performed as follows. By using a target separator, a test cell is produced so as to separate aqueous electrolytic solutions having different anion species from each other. When the charge and discharge are possible without mixing of the anion species between the two kinds of the aqueous electrolytic solutions separated by the target separator with each other, it can be confirmed that the target separator is selectively permeable to the monovalent cations.

The non-mixing of the anions species with each other between the two kinds of the aqueous electrolytic solutions can be confirmed, for example, by separating and quantifying ion species components contained in each aqueous electrolytic solution by ion chromatography. Alternatively, it can be confirmed by performing quantitative analysis of ion species contained in each aqueous electrolytic solution by Inductively Coupled Plasma (ICP) analysis.

The separator is, for example, a sheet-shaped member having a first principal surface and a second principal surface. At least a part of the first principal surface of the separator faces the negative electrode active material-containing layer. At least a part of the first principal surface of the separator is preferably in contact with the negative electrode active material-containing layer. The entire principal surface of the negative electrode active material-containing layer facing the first principal surface of the separator is preferably in contact with the first principal surface of the separator. In this case, since the electrolysis of water can be efficiently suppressed, the excellent charge-and-discharge property and the excellent cycle life performance can be achieved.

A contact angle $\theta1$ of the first principal surface of the separator with respect to the aqueous electrolyte is $90° \leq \theta1 < 180°$. The contact angle $\theta1$ is preferably $106° \leq \theta1 < 180°$, more preferably $124° \leq \theta1 < 180°$.

That is, the first principal surface of the separator has water repellency against the aqueous electrolyte. Therefore, water molecules contained in the aqueous electrolyte is hardly permeable to the first principal surface of the separator. Since such a first principal surface is in contact with the negative electrode active material-containing layer, the amount of water molecules supplied near the negative electrode active material-containing layer can be reduced.

The second principal surface of the separator may or may not be in contact with a positive electrode active material-containing layer. When the second principal surface of the separator is in contact with the positive electrode active material-containing layer, the contact angle $\theta1$ of the first principal surface is preferably larger than a contact angle $\theta2$ of the second principal surface with respect to the aqueous electrolyte. By doing so, hydrogen over-charge on the first principal surface and the second principal surface increases, thereby improving charge-and-discharge efficiency.

When the contact angle $\theta2$ of the second principal surface is $10 \leq \theta2 < 90°$, it is possible to hold a sufficient aqueous electrolyte at an interface between the separator and the positive electrode active material-containing layer. Therefore, a variation in pH of the aqueous electrolyte or the like in the vicinity of the second principal surface can be suppressed, and the electrolysis of water can be more suppressed, thereby improving charge-and-discharge efficiency.

The separator includes at least one selected from the group consisting of, for example, an oxide type solid electrolyte, a polymer type solid electrolyte, a glass electrolyte, and a monovalent selective cation exchange membrane. The separators may be made of one kind of the above materials or a combination of two or more kinds.

The separator preferably includes a glass electrolyte. The separator may be formed from the glass electrolyte. It is preferable that the separator includes the glass electrolyte, because the separator can be easily made into a thin film, can be made resistant to heat, and can increase stability against water.

The oxide type solid electrolyte, the polymer type solid electrolyte, and the glass electrolyte are formed from, for example, a plurality of particles. An average particle size of the particles constituting the separator is, for example, 0.1 µm to 2 µm.

Examples of the oxide type solid electrolyte are oxides such as LATP ($Li_{1+x}Al_xTi_{2-x}(PO_4)_3$) ($0.1 \leq x \leq 0.5$) or $Li_{1.5}Al_{0.5}Ge_{1.5}(PO_4)_3$ having a NASICON type skeleton, amorphous LIPON ($Li_{2.9}PO_{3.3}N_{0.46}$), and garnet type LLZ ($Li_7La_3Zr_2O_{12}$).

The polymer type solid electrolyte includes, for example, a polymer material and an electrolyte salt. The polymer type solid electrolyte may be formed from the polymer material and the electrolyte salt. The polymer type solid electrolyte may further include a solvent such as an organic solvent.

Examples of the polymer material include a polyether-based material, a polyester-based material, a polyamine-based material, a silicon-based material, and a polysulfide-based material.

Examples of the electrolyte salt include an alkali metal salt such as a lithium salt and a sodium salt. The polymer type solid electrolyte may include one kind of electrolyte salt or two or more kinds of electrolyte salts.

Examples of the lithium salt include LiCl, LiBr, LiOH, $Li_2SO_4$, $LiNO_3$, $CH_3COOLi$, LiN($SO_2CF_3$)$_2$ (LiTFSI: lithium bis(trifluoromethanesulfonyl)imide), LiN($SO_2F$)$_2$ (LiFSI: lithium bis(fluorosulfonyl)imide), and $LiB[(OCO)_2]_2$ (LiBOB: lithium bis(oxalate)borate).

Examples of the sodium salt include NaCl, $Na_2SO_4$, NaOH, $NaNO_3$, NaTFSA (sodium trifluoromethanesulfonylamide), and the like.

The glass electrolyte includes phosphorus in the structure among the oxide type solid electrolytes. That is, the oxide type solid electrolyte includes the glass electrolyte. Examples of the glass electrolyte include LATP ($Li_{1+x}Al_xTi_{2-x}(PO_4)_3$ ($0.1 \leq x \leq 0.5$)) or $Li_{1.5}Al_{0.5}Ge_{1.5}(PO_4)_3$ having a NASICON type skeleton, and amorphous LIPON ($Li_{2.9}PO_{3.3}N_{0.46}$).

An example of the monovalent selective cation exchange membrane is an anionic polymerized membrane. Examples of a polar functional group contained in the anionic polymerized membrane includes a hydroxyl group, a carboxyl group, a sulfonic acid group, a phosphate group, a carboxylate group, a sulfonate group, a phosphonate group, an amino group, an imino group, an ammonium group, an iminium group, a sulfonium group, and a phosphonium group. The polar functional groups may be contained alone or plural kinds thereof may be contained. The anionic polymer constituting the anionic polymerized film is, for example, a mixture of polyvinyl alcohol containing an anion group or a polymer containing an anion group, and polyvinyl alcohol containing no anion group.

The separator preferably has a thickness of 10 µm to 150 µm and a density of 0.2 g/cm³ to 6 g/cm³. When the thickness and the density of the separator are within these ranges, it is possible to provide a secondary battery which is capable of balancing a reduction in mechanical strength and battery resistance and suppressing internal short circuit with high power. In addition, heat shrinkage of the separator in a high temperature environment is small, and the excellent high temperature storage performance can be exhibited.

A method of adjusting the contact angle $\theta1$ of the first principal surface of the separator or the contact angle $\theta2$ of the second principal surface of the separator will be described.

For example, when the surface of the principal surface of the separator is modified with a hydrophobic group, the contact angle of the corresponding surface with respect to the aqueous electrolyte can be increased. Examples of the hydrophobic group include a methyl group, a phenol group, a methoxy group, an alkyl group, an amino group, an acetyl group, a methoxy group, and a carboxyl group. The first principal surface of the separator preferably includes the hydrophobic group.

In addition, for example, when the surface of the principal surface of the separator is modified with a hydrophilic group, the contact angle of the corresponding surface with respect to the aqueous electrolyte can be reduced. Examples of the hydrophilic group include a hydroxyl group, a carboxyl group, a sulfo group, a hydroxy group, and a nitro group.

Examples of the method of modifying the hydrophobic group or the hydrophilic group include a coupling agent modification method, a polymer graft copolymerization method, an encapsulation method, a sol-gel method, and the like. The modification of the hydrophobic group or the hydrophilic group on the principal surface of the separator can be performed when the separator includes at least one selected from the group consisting of an oxide type solid electrolyte, a polymer type solid electrolyte, and a glass electrolyte.

In addition, the contact angle with respect to the aqueous electrolyte can be adjusted by changing surface roughness of the surface of the principal surface of the separator. In a case where the surface before the change of the surface roughness is hydrophobic, the contact angle tends to increase when the surface roughness increases, and the contact angle tends to decrease when the surface roughness decreases. The term "hydrophobic" means a case where the contact angle θ is 90° or more.

On the other hand, in a case where the surface before the change of the surface roughness is hydrophilic, the contact angle tends to decrease when the surface roughness increases, and the contact angle tends to increase when the surface roughness decreases. The term "hydrophilic" means a case where the contact angle θ is less than 90°.

Examples of the method of changing the surface roughness include polishing of a surface. The polishing is performed, for example, when the separator is formed from a solid electrolyte. The polishing can be performed, for example, by setting a file on a rotating sample table, rotating the sample table while dropping pure water, and pressing the principal surface of the separator thereto.

In addition, as described below, the contact angle of the principal surface of the separator with respect to the aqueous electrolyte can be changed by changing properties of the aqueous electrolyte.

<Method of Measuring Contact Angle>

First, a battery including an electrolytic solution and/or a gel electrolyte as an aqueous electrolyte is disassembled. When there is an excess of the aqueous electrolyte, the excess is spontaneously separated and thus it is recovered in another container. When there is no excess of the aqueous electrolyte, for example, when it is not separated spontaneously and when the aqueous electrolyte is impregnated into an electrode part, centrifugal separation is performed to separate the electrode and the aqueous electrolyte, and the aqueous electrolyte is recovered. By using the obtained aqueous electrolyte, the contact angle θ1 of the first principal surface of the separator and the contact angle θ2 of the second principal surface of the separator are measured by a static drop method based on JIS R 3257:1999.

(2) Aqueous Electrolyte

The aqueous electrolyte includes, for example, a water-containing solvent, and a lithium salt or a sodium salt as an electrolyte salt. The aqueous electrolyte is, for example, an aqueous solution containing lithium ions or sodium ions. The aqueous electrolyte may contain both lithium ions and sodium ions. The aqueous electrolyte may be a gel-like aqueous electrolyte in which an aqueous electrolytic solution and a polymer material are combined. Examples of the polymer material include polyvinylidene fluoride (PVdF), polyacrylonitrile (PAN), polyethylene oxide (PEO), and the like.

The water-containing solvent may be pure water, or may be a mixed solution and/or a mixed solvent of water and a material other than water.

In the aqueous electrolyte, it is preferable that the amount of the solvent (for example, the amount of water in the water-containing solvent) is 1 mol or more based on 1 mol of an electrolyte salt as a solute. It is more preferable that the amount of the solvent is 3.5 mol or more based on 1 mol of the electrolyte salt.

That the aqueous electrolyte contains water can be confirmed by GC-MS (Gas Chromatography-Mass Spectrometry). The salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. The numbers of moles of the solute and the solvent can be calculated by measuring the specific gravity of the aqueous electrolyte.

The aqueous electrolytic solution is prepared, for example, by dissolving a lithium salt in an aqueous solvent at a concentration of 1 to 12 mol/L. In order to suppress the electrolysis of the aqueous electrolyte, LiOH or $Li_2SO_4$ or the like can be added to adjust pH. pH is preferably 3 to 13, more preferably 4 to 12.

When a salt having high solubility is used as the electrolyte salt, a cation concentration and an anion concentration in the aqueous electrolyte can be increased. Cations or anions generated by ionization of the electrolyte salt may each be bonded to water molecules. Therefore, when a cation concentration and an anion concentration in the electrolyte increases, a probability that water molecules in a solvent will be bonded to cations or anions is increased. That is, when the concentration of the electrolyte salt in the aqueous electrolyte is increased, a contact angle of the principal surface of the separator with respect to the aqueous electrolyte tends to be increased.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalate)borate). The kind of the lithium salt used may be one kind or may be two or more kinds. In addition, the aqueous electrolyte may contain salts other than the lithium salt. Examples of the salts other than the lithium salt include $ZnSO_4$.

Examples of the sodium salt include NaCl, $Na_2SO_4$, NaOH, $NaNO_3$, NaTFSA (sodium trifluoromethanesulfonylamide), and the like. The kind of the sodium salt used may be one kind or may be two or more kinds.

When the aqueous electrolyte contains inorganic anion species as the electrolyte salt, the contact angle of the principal surface of the separator tends to increase. On the other hand, when the aqueous electrolyte contains organic anion species, the contact angle of the principal surface of the separator tends to decrease as compared with the case where the aqueous electrolyte contains inorganic anion species. This is thought to be due to the fact that an organic anion species has a larger molecular size, so that the amount of water per unit volume decreases. When the amount of water per unit volume decreases, the van der Waals force (intermolecular force) between water molecules is weakened. Thus, the contact angle is considered to be low.

Examples of the inorganic anion species include a chloride ion (Cl$^-$), a bromide ion (Br$^-$), a hydroxide ion (OH$^-$), a sulfate ion (SO$_4^{2-}$), and a nitrate ion (NO$_3^-$).

Examples of the organic anion species include an acetate ion, a bis(trifluoromethanesulfonyl)imide ion (N(SO$_2$CF$_3$)$_2^-$), a bis(fluorosulfonyl)imide ion (N(SO$_2$E)$_2^-$), and a bis oxalate borate ion (B[(OCO)$_2$]$_2^-$). The aqueous electrolyte may include one kind of anion species or may include two or more kinds of anion species.

In a case where the aqueous electrolyte includes anions having a large ionic radius, the contact angle of the principal surface of the separator tends to be low, as compared with a case where the aqueous electrolyte includes anions having a smaller ionic radius. It is considered that this is because as the ionic radius of the anion is larger, the van der Waals force (intermolecular force) between water molecules is weakened.

For example, when an aqueous solution containing lithium chloride is used as the electrolytic solution that is in contact with the first principal surface (negative electrode side) of the separator and an aqueous solution containing lithium sulfate is used as the electrolytic solution that is in contact with the second principal surface (positive electrode side) of the separator, the contact angle θ2 of the second principal surface can be made smaller than the contact angle θ1 of the first principal surface. It is considered that this is because the ionic radius of the sulfate ion is larger than the ionic radius of the chloride ion.

The aqueous electrolyte preferably includes at least one selected from a chloride ion (Cl$^-$), a hydroxide ion (OH$^-$), a sulfate ion (SO$_4^{2-}$), a nitrate ion (NO$_3^-$), and an acetate ion (CH$_3$COO$^-$). In this case, the contact angle θ1 of the first principal surface of the separator with respect to the aqueous electrolyte is increased, thereby achieving the excellent charge-and-discharge property and cycle life performance.

(3) Negative Electrode

The negative electrode includes a negative electrode current collector and a negative electrode active material-containing layer which is supported on one side or both sides of the negative electrode current collector and includes an active material, a conductive agent, and a binder.

Examples of the negative electrode active material includes at least one of titanium-containing oxides such as titanium oxide, lithium-titanium oxide, niobium-titanium oxide, and sodium-niobium-titanium oxide. Li insertion potential of the titanium-containing oxide is preferably 1.2 V (vs. Li/Li$^+$) to 2.0 V (vs. Li/Li$^+$). The negative electrode active material can include one or more of these titanium-containing oxides.

The titanium oxide includes, for example, titanium oxide having a monoclinic structure, titanium oxide having a rutile structure, and titanium oxide having an anatase structure. In the titanium oxide of each crystal structure, a composition before charge can be represented by TiO$_2$, and a composition after charge can be represented by Li$_x$TiO$_2$ (0≤x≤1). In addition, the structure of the titanium oxide having the monoclinic structure before charge can be represented by TiO$_2$(B).

The lithium-titanium oxide includes, for example, a lithium-titanium oxide having a spinel structure (for example, general formula of Li$_{4+x}$Ti$_5$O$_{12}$ (−1≤x≤3)), orthorhombic titanium oxide (for example, general formula of Li$_{2+z}$M(I)$_{2-b}$Ti$_{6-c}$M(II)$_d$O$_{14+o}$ (0≤a≤6, 0<b<2, 0<c<6, 0d<6, −0.5≤δ≤0.5, M(I) is at least one element selected from the group consisting of Sr, Ba, Ca, Mg, Na, Cs, and K, and M(II) is at least one element selected from the group consisting of Zr, Sn, V, Nb, Ta, Mo, W, Fe, Co, Mn, Al, Y), lithium-titanium oxide having a ramsdellite structure (for example, Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), Li$_{1+x}$TiO$_2$ (0<x≤1)), and the like. In addition, the lithium-titanium oxide may be a lithium-titanium composite oxide in which dopants are introduced.

The niobium-titanium oxide includes, for example, a material represented by Li$_a$TiM$_b$Nb$_{2\pm\beta}$O$_{7\pm\sigma}$ (0≤a≤5, 0≤b≤0.3, 0≤β≤0.3, 0≤σ≤0.3, and M is at least one element selected from the group consisting of Fe, V, Mo, and Ta).

The sodium-niobium-titanium oxide includes, for example, orthorhombic Na-containing niobium-titanium composite oxide represented by general formula of Li$_{2+v}$Na$_{2-w}$M1$_x$Ti$_{6-y-z}$Nb$_y$M2$_z$O$_{14+\delta}$ (0≤v≤4, 0<w<2, 0≤x<2, 0<y<6, 0≤z<3, −0.5≤δ≤0.5, M1 includes at least one selected from Cs, K, Sr, Ba, and Ca, and M2 includes at least one selected from Zr, Sn, V, Ta, Mo, W, Fe, Co, Mn, and Al).

The negative electrode active material is preferably at least one selected from the group consisting of spinel lithium titanate (for example, Li$_4$Ti$_5$O$_{12}$), anatase type titanium oxide (for example, TiO$_2$), niobium-titanium oxide, and sodium-niobium-titanium oxide.

The negative electrode active material is included, for example, in the state of a particle in the negative electrode. The negative electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

An average particle size (diameter) of the secondary particles of the negative electrode active material is preferably larger than 3 μm. The average particle size of the secondary particles is more preferably 5 to 20 μm. Within this range, the surface area of the active material is small and the generation of hydrogen can be suppressed. On the other hand, the average particle size of the primary particles of the negative electrode active material is desirably set to be 1 μm or less. This makes the effect prominent at high input performance.

To stably operate the negative electrode active material in the aqueous electrolyte, the negative electrode current collector is preferably made of zinc.

Near a potential where a charge-and-discharge reaction for a titanium-containing oxide holds, hydrogen generation caused by electrolysis of the aqueous electrolyte readily occurs. In particular, electrolysis readily occurs on a current collector with high conductivity. Since the active material is easily separated from the current collector by bubbles of generated hydrogen, a continuous charge-and-discharge reaction to the active material hardly holds. Since zinc hardly causes hydrogen generation, separation of the active material layer from the current collector hardly occurs, and charge and discharge for the titanium-containing oxide are possible even at about 1.5 V in a standard lithium potential. Zinc is an inexpensive metal and is preferable from this viewpoint as well.

Even if an element other than zinc is included in the current collector, the same effect can be obtained. The element other than zinc is preferably at least one selected from Ga, In, Bi, Tl, Sn, Pb, Ti, Al, Sn, and Pb. By including these metals as an alloy or a single metal, the mechanical strength of the current collector can be increased and the processing performance can be improved. Furthermore, when these metals are included, the electrolysis can be suppressed and the generation of hydrogen can be more controlled. More preferable metals are Pb, Ti, and Al.

The same effect can be obtained even if zinc, or alloys containing zinc, or mixtures of zinc and other metals is present on the surface of the current collector. Specifically, these metals may be plated on another substrate, for example, Al. Al, Fe, Cu, Ni, and Ti are preferable as the metal serving as the substrate, and Al and Ti are more preferable. The thickness of zinc present on the surface of the current collector is preferably 0.1 µm to 10 µm. When the thickness is less than 0.1 µm, the effect of suppressing the generation of hydrogen is small, and when the thickness exceeds 10 µm, it is feared that the adhesion with the metal serving as the substrate is deteriorated. A more preferable range is 0.2 µm to 2 µm.

The thickness of the negative electrode current collector is, for example, 10 µm to 500 µm. When the thickness is less than 10 µm, a possibility of foil breakage at the time of production increases, and when the thickness exceeds 500 µm, there is a possibility that a volume energy density as a battery will be reduced. The thickness of the negative electrode current collector is preferably 20 µm or less, more preferably 15 µm or less.

A conductive agent is added if necessary, in order to increase the current-collecting performance and to suppress the contact resistance between the active material and the current collector. Examples of the conductive agent include carbonaceous materials such as acetylene black, Ketjen black, graphite, and coke. The conductive agent may be used alone or as a mixture of two or more kinds.

A binder has a function to bind the active material, the conductive agent, and the current collector. As the binder, it is possible to use, for example, at least one compound selected from the group consisting of polytetrafluoroethylene (PTFE), polyvinylidene fluoride (PVdF), cellulose members such as sodium carboxymethyl cellulose (CMC), fluororubber, styrene-butadiene rubber (SBR), polypropylene (PP), polyethylene (PE), polyimide (PI), and polyacrylimide (PAI), but the binder is not limited thereto. The binders may be used alone or as a mixture of two or more kinds.

In the compounding ratios of the negative electrode active material, the conductive agent, and binder in the negative electrode active material-containing layer, it is preferable that the negative electrode active material is within a range of 80% by weight to 95% by weight, the conductive agent is within a range of 3% by weight to 18% by weight, and the binder is within a range of 2% by weight to 7% by weight. When the content of the conductive agent is less than 3% by weight, the current-collecting performance of the negative electrode active material layer is reduced, and the large current performance of the battery may possibly be reduced. In addition, when the content of the binder is less than 2% by weight, the binding property between the negative electrode active material-containing layer and the negative electrode current collector is reduced, and the cycle performance may possibly be reduced. On the other hand, in order to make the capacity higher, it is preferable that the contents of the conductive agent and the binder are respectively 18% by weight or less and 7% by weight or less.

The negative electrode can be produced by, for example, the following method. First, a slurry is prepared by suspending a negative electrode active material, a conductive agent, and a binder in an appropriate solvent. Subsequently, the slurry is coated on one side or both sides of a negative electrode current collector. Here, as the negative electrode current collector, a negative electrode current collector on which a coating layer is previously formed by the above-described method is used. The coating film on the negative electrode current collector is dried to form a negative electrode active material layer. After that, the negative electrode current collector and the negative electrode active material-containing layer formed thereon are pressed. As the negative electrode active material-containing layer, a negative electrode active material, a conductive agent, and a binder formed in pellet form may be used.

(4) Positive Electrode

The positive electrode includes a positive electrode current collector and a positive electrode active material-containing layer which is supported on one side or both sides of the positive electrode current collector and includes an active material, a conductive agent, and a binder.

The positive electrode current collector is formed from, for example, a metal such as stainless steel, Al, Ti, and the like. The positive electrode current collector is in the form of, for example, a foil, a porous body, or a mesh. In order to prevent corrosion of the current collector due to reaction between the current collector and the electrolytic solution, the surface of the current collector may be coated with dopants. It is preferable that the positive electrode current collector is excellent in corrosion resistance and oxidation resistance, like Ti foil or the like.

A substance allowing lithium to be inserted and extracted can be used for the positive electrode active material. The positive electrode may contain one kind of the positive electrode active material or may contain two or more kinds of the positive electrode active material. Examples of the positive electrode active material may include lithium-manganese composite oxides, lithium-nickel composite oxides, lithium-cobalt composite oxides, lithium-cobalt-aluminum composite oxides, lithium-nickel-cobalt-manganese composite oxides, spinel lithium-manganese-nickel composite oxides, lithium-manganese-cobalt composite oxides, lithium-iron oxide, lithium-iron fluorinated sulfate, and phosphate compounds having an olivine crystal structure (for example, $Li_xFePO_4$ where $0 \le x \le 1$, and $Li_xMnPO_4$ where $0 \le x \le 1$), and the like. The phosphate compound having the olivine crystal structure has the excellent thermal stability.

Examples of the positive electrode active material may include lithium manganese composite oxides such as $Li_xMn_2O_4$ and $Li_xMnO_2$, lithium-nickel-aluminum composite oxides such as $Li_xNi_{1-y}Al_yO_2$, lithium-cobalt composite oxides such as $Li_xCoO_2$, lithium-nickel-cobalt composite oxides such as $Li_xNi_{1-y-z}Co_yMn_zO_2$, lithium-manganese-cobalt composite oxides such as $Li_xMn_yCo_{1-y}O_2$, spinel lithium-manganese-nickel composite oxides such as $Li_xMn_{2-y}Ni_yO_4$, lithium-phosphorus oxides having an olivine structure such as $Li_xFePO_4$, $Li_xFe_{1-y}Mn_yPO_4$, or $Li_xCoPO_4$, and iron fluorinated sulfate such as $Li_xFeSO_4F$. x and y are preferably within a range of 0 to 1 unless otherwise specified.

Among them, according to lithium-nickel-aluminum composite oxides, lithium-nickel-cobalt manganese composite oxides, and lithium-manganese-cobalt composite oxides, it is possible to suppress the reaction with the nonaqueous electrolyte in a high temperature environment, and the battery life can be greatly improved. In particular, lithium-nickel-cobalt-manganese composite oxides represented by $Li_xNi_{1-y-z}Co_yMn_zO_2$ ($0 \le x \le 1.1$, $0 \le y \le 0.5$, $0 \leq z \leq 0.5$) is preferable. By using lithium-nickel-cobalt-manganese composite oxides, higher temperature durability life can be obtained.

The positive electrode active material is included, for example, in the state of particle in the positive electrode. The positive electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

A conductive agent is added if necessary, in order to increase the current-collecting performance and to suppress the contact resistance between the active material and the current collector. Examples of the conductive agent include carbonaceous materials such as acetylene black, Ketjen black, graphite, and coke. The conductive agent may be used alone or as a mixture of two or more kinds.

A binder has a function to bind the active material, the conductive agent, and the current collector. As the binder, it is possible to use, for example, at least one compound selected from the group consisting of polytetrafluoroethylene (PTFE), polyvinylidene fluoride (PVdF), cellulose members such as sodium carboxymethyl cellulose (CMC), fluororubber, styrene-butadiene rubber (SBR), polypropylene (PP), polyethylene (PE), polyimide (PI), and polyacrylimide (PAI), but the binder is not limited thereto. The binders may be used alone or as a mixture of two or more kinds.

In the compounding ratios of the positive electrode active material, the conductive agent, and binder in the positive electrode active material-containing layer, it is preferable that the positive electrode active material is within a range of 80% by weight to 95% by weight, the conductive agent is within a range of 3% by weight to 18% by weight, and the binder is within a range of 2% by weight to 7% by weight. When the content of the conductive agent is 3% by weight or more, the effect described above can be exerted. When the content of the conductive agent is 18% by weight or less, decomposition of the electrolyte on the surface of the conductive agent can be reduced when high temperature is maintained. When the content of the binder is 2% by weight or more, sufficient electrode strength can be obtained, and when the content of the binder is 7% by weight or less, the insulating part of the electrode can be reduced.

(5) Container Member

A metal container, a container formed from a laminate film, or a resin container formed from polyethylene, polypropylene, or the like can be used as the container member which houses the positive electrode, the negative electrode, and the aqueous electrolyte.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes.

Hereinafter, an example of the secondary battery according to the embodiment will be described with reference to FIGS. 1 to 5.

FIG. 1 is a plan view schematically showing one example of secondary batteries according to the embodiment.

The secondary battery 100 includes a positive electrode 5, a negative electrode 3, a separator 4, and an aqueous electrolyte (not shown). The positive electrode 5, the negative electrode 3, the separator 4, and the aqueous electrolyte are housed, for example, in the container member 2 shown in FIG. 1.

The positive electrode 5 includes a positive electrode current collector 5a and positive electrode active material-containing layers 5b provided on one side or both sides of the positive electrode current collector 5a. The negative electrode 3 includes a negative electrode current collector 3a and negative electrode active material-containing layers 3b provided on one side or both sides of the negative electrode current collector 3a. A part of the positive electrode current collector 5a extends outward from the container member 2. A part of the negative electrode current collector 3a extends outward from the container member 2.

The separator 4 includes a first principal surface 4a and a second principal surface 4b. As shown in FIG. 1, the first principal surface 4a of the separator 4 is in contact with the negative electrode active material-containing layer 3b. The second principal surface 4b of the separator 4 is in contact with the positive electrode active material-containing layer 5b. The separator 4 may not be in contact with the positive electrode active material-containing layer 5b. As shown in FIG. 1, the whole surface of the negative electrode active material-containing layer 3b is preferably in contact with the separator 4. In this case, since the electrolysis of water can be efficiently suppressed, the excellent charge-and-discharge property and the excellent cycle life performance can be achieved.

FIG. 2 is a cross-sectional view schematically showing another example of secondary batteries according to the embodiment. FIG. 3 is an enlarged cross-sectional view showing a part A of the secondary battery shown in FIG. 2.

The secondary battery 100 shown in FIG. 2 and FIG. 3 includes a bag-shaped container member 2 shown in FIG. 2, an electrode group 1 shown in FIG. 2 and FIG. 3, and an aqueous electrolyte (not shown). The electrode group 1 and the aqueous electrolyte are housed in the container member 2. The aqueous electrolyte is held in the electrode group 1.

The bag-shaped container member 2 is formed from a laminate film including two resin layers and a metal layer disposed therebetween.

As shown in FIG. 2, the electrode group 1 is a flat wound electrode group. The flat wound electrode group 1 includes negative electrodes 3, separators 4, and positive electrodes 5 as shown in FIG. 3. The separator 4 is disposed between the negative electrode 3 and the positive electrode 5.

The negative electrode 3 includes a negative electrode current collector 3a and negative electrode active material-containing layers 3b. In the portion of the negative electrode 3 located at the outermost shell of the wound electrode group 1, the negative electrode active material-containing layer 3b is formed only on the inside surface side of the negative electrode current collector 3a, as shown in FIG. 3. In another portion of the negative electrode 3, the negative electrode active material-containing layer 3b is formed on both sides of the negative electrode current collector 3a.

The positive electrode 5 includes a positive electrode current collector 5a and positive electrode active material-containing layers 5b formed on both sides thereof.

As shown in FIG. 2, a negative electrode terminal 6 and a positive electrode terminal 7 are located in the vicinity of the outer peripheral end of the wound electrode group 1. The negative electrode terminal 6 is connected to a part of the negative electrode current collector 3a of the negative electrode 3 located at the outermost shell. In addition, the positive electrode terminal 7 is connected to the positive electrode current collector 5a of the positive electrode 5 located at the outermost shell. The negative electrode terminal 6 and the positive electrode terminal 7 extend outward from an opening of the bag-shaped container member 2.

The wound electrode group 1 is sealed by heat-sealing the opening of the bag-shaped container member 2 with the negative electrode terminal 6 and the positive electrode terminal 7 interposed therebetween.

Figure 5:
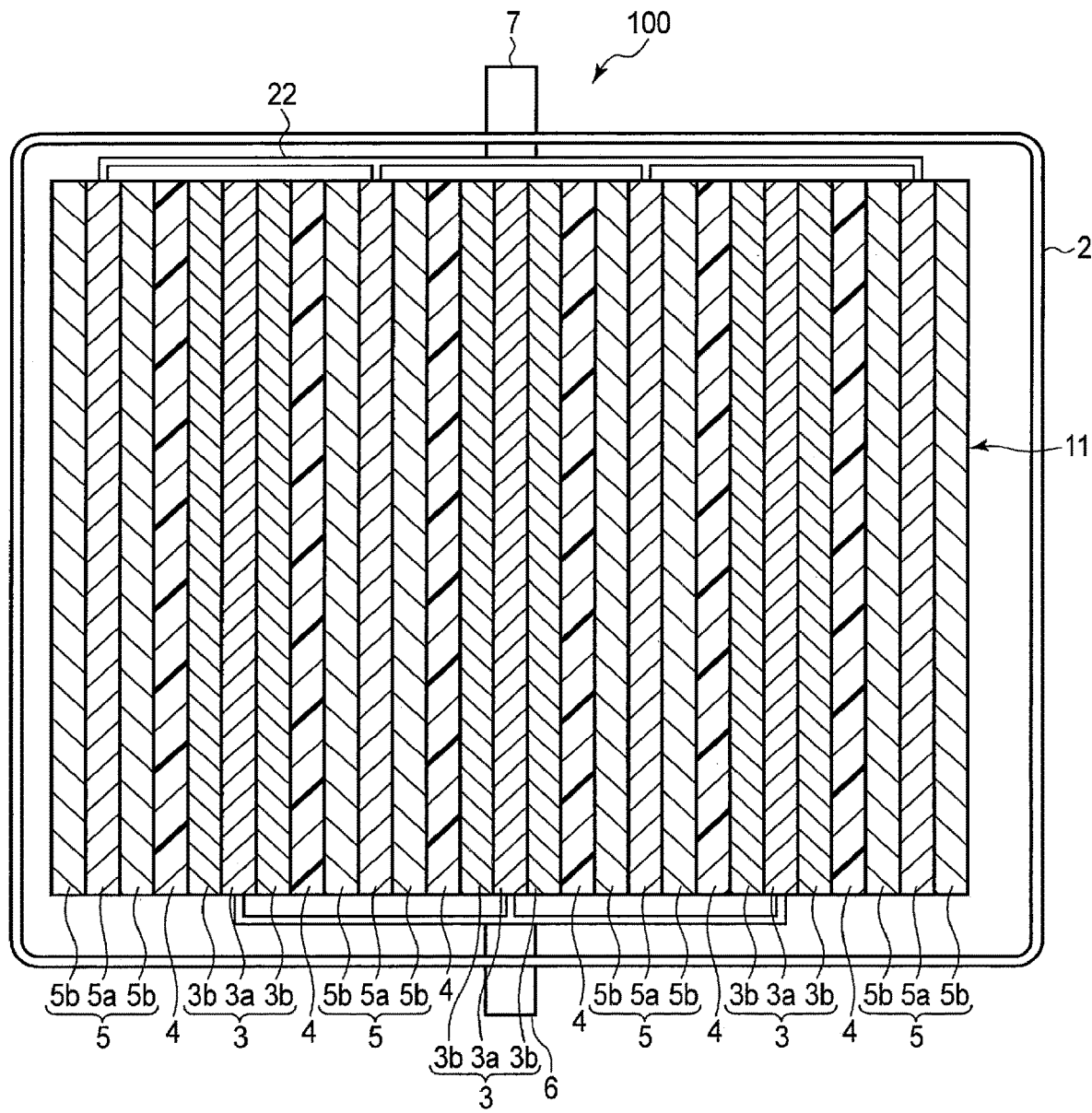
FIG. 5 is a plan view schematically showing another example of the secondary batteries according to the first embodiment.

The secondary battery according to the embodiment may be, for example, batteries having structures shown in FIG. 4 and FIG. 5.

FIG. 4 is a plan view schematically showing another example of secondary batteries according to the embodiment. FIG. 5 is a plan view showing a variation of the secondary battery shown in FIG. 4.

The secondary battery 100 shown in FIG. 4 includes an electrode group 11, a container member 2, and an aqueous electrolyte (not shown). The electrode group 11 and the aqueous electrolyte are housed in the container member 2. The aqueous electrolyte is held in the electrode group 11.

The container member 2 is formed from a laminate film including two resin layers and a metal layer disposed therebetween.

As shown in FIG. 4, the electrode group 11 is a laminated electrode group. The laminated electrode group 11 has a structure in which a positive electrode 5 and a negative electrode 3 are alternately laminated with a separator 4 interposed therebetween.

The electrode group 11 includes multiple positive electrodes 5. Each of the positive electrodes 5 includes a positive electrode current collector 5a and positive electrode active material-containing layers 5b supported on both sides of the positive electrode current collector 5a. In addition, the electrode group 11 includes multiple negative electrodes 3. Each of the negative electrodes 3 includes a negative electrode current collector 3a and negative electrode active material-containing layers 3b supported on both sides of the negative electrode current collector 3a. A negative electrode current collector 3a of each negative electrode 3 is electrically connected to an end part of a negative electrode lead 23. The other end part of the negative electrode lead 23 is electrically connected to the negative electrode terminal 6. A part of the negative electrode terminal 6 is drawn outward from the container member 2. The positive electrode current collector 5a of each positive electrode 5 is electrically connected to the end part of the positive electrode lead 22. The other end part of the positive electrode lead 22 is electrically connected to the positive electrode terminal 7. A part of the positive electrode terminal 7 is drawn outward from the container member 2. The negative electrode terminal 6 and the positive electrode terminal 7 which are drawn out to the outside protrude from the same side of the container member 2.

The secondary battery 100 shown in FIG. 5 has the same structure as the secondary battery 100 shown in FIG. 4, except that the surface from which the negative electrode terminal 6 protrudes differs from the surface from which the positive electrode terminal 7 protrudes.

The secondary battery according to the present embodiment may constitute a battery module. The battery module may include multiple secondary batteries according to the present embodiment.

In the battery module according to the embodiment, individual unit cells may be electrically connected in series or in parallel, or may be arranged in combination of series connection and parallel connection.

Next, one example of battery modules according to the embodiment is explained with reference to the drawings.

FIG. 6 is a perspective view schematically showing an example of the battery module according to the embodiment. A battery module 200 shown in FIG. 6 includes five battery cells 100, four bus bars 21, a positive electrode-side lead 22, and a negative electrode-side lead 23. Each of the five battery cells 100 is a secondary battery according to the embodiment.

Each bus bar 21 connects a negative electrode terminal 6 of one battery cell 100 and a positive electrode terminal 7 of the another battery cell 100 positioned adjacent. The five battery cells 100 are thus connected in series by the four bus bars 21. That is, the battery module 200 shown in FIG. 6 is a battery module of five in-series connection.

As shown in FIG. 6, the positive electrode terminal 7 of the battery cell 100 located at one end on the left among the row of the five battery cells 100 is connected to the positive electrode-side lead 22 for external connection. In addition, the negative electrode terminal 6 of the battery cell 100 located at the other end on the right among the row of the five battery cells 100 is connected to the negative electrode-side lead 23 for external connection.

The secondary battery according to the first embodiment includes a positive electrode, a negative electrode including a negative electrode active material-containing layer, an aqueous electrolyte, and a separator selectively permeable to monovalent cations. The separator includes a first principal surface facing the negative electrode active material-containing layer and a second principal surface. A contact angle θ1 of the first principal surface with respect to the aqueous electrolyte is 90°≤θ1<180°. Therefore, the electrolysis of water hardly occurs, thereby achieving the excellent charge-and-discharge property and the excellent cycle life performance.

Second Embodiment

According to a second embodiment, a battery pack is provided. The battery pack includes a battery module with a single secondary battery or multiple secondary batteries according to the first embodiment.

The battery pack may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the second embodiment will be described with reference to the drawings.

Figure 7:
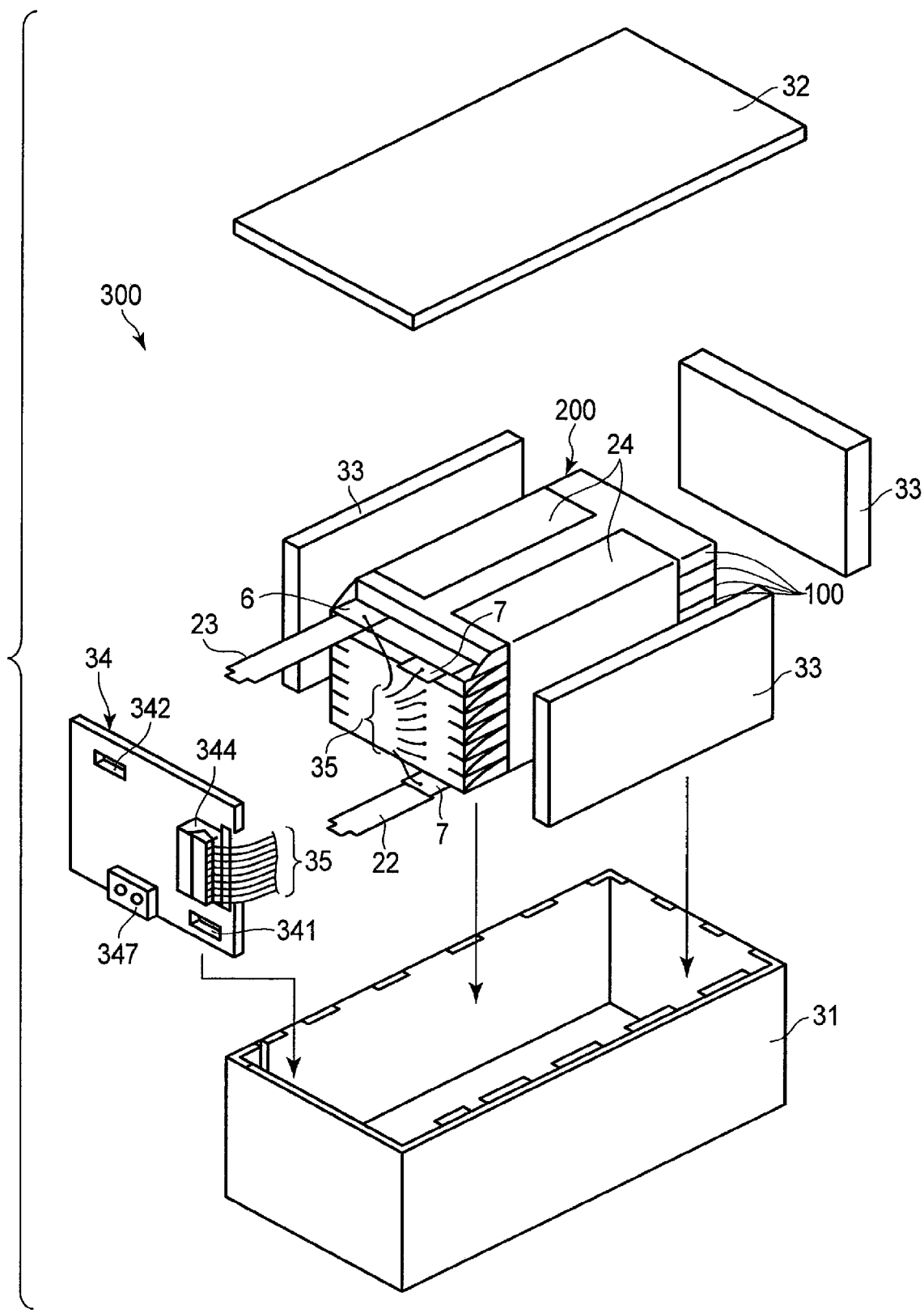
FIG. 7 is an exploded perspective view schematically showing one example of battery packs according to a second embodiment.

FIG. 7 is an exploded perspective view schematically showing an example of the battery pack according to the second embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 is configured to house the protective sheets 33, the battery module 200, the printed wiring board 34, and the wires 35. The lid 32 covers the housing container 31 to house the battery module 200 and the like. Although not shown, opening(s) or connection terminal(s) for connecting to external device(s) and the like are provided on the housing container 31 and lid 32.

The protective sheets 33 are arranged on both inner surfaces of the housing container 31 along the long-side direction and on one inner surface of the housing container 31 along the short-side direction. The printed wiring board 34 is arranged on the other inner surface of the housing container 31 along the short-side direction. The protective sheets 33 are made of, for example, resin or rubber.

The battery module 200 includes plural battery cells 100, a positive electrode-side lead 22, a negative electrode-side lead 23, and an adhesive tape 24. The battery module 200 may alternatively include only one battery cell 100.

The battery cell 100 has, for example, a structure shown in FIGS. 1 and 2. At least one of the plural battery cells 100 is a secondary battery according to the second embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 8. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of a motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

The battery pack according to the second embodiment includes the secondary battery according to the first embodiment. Therefore, the battery pack can achieve the excellent charge-and-discharge property and the excellent cycle life performance.

Third Embodiment

According to a third embodiment, a vehicle is provided. The vehicle is equipped with the battery pack according to the second embodiment.

In the vehicle according to the third embodiment, the battery pack is configured, for example, to recover regenerative energy from motive force of the vehicle.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

Next, an example of the vehicle according to the embodiment is explained below, with reference to the drawings.

FIG. 9 is a cross-sectional view schematically showing an example of a vehicle according to the embodiment.

A vehicle 400, shown in FIG. 9 includes a vehicle body 40 and a battery pack 300 according to the embodiment. The vehicle 400 shown in FIG. 9 is a four-wheel automobile.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400.

Figure 10:
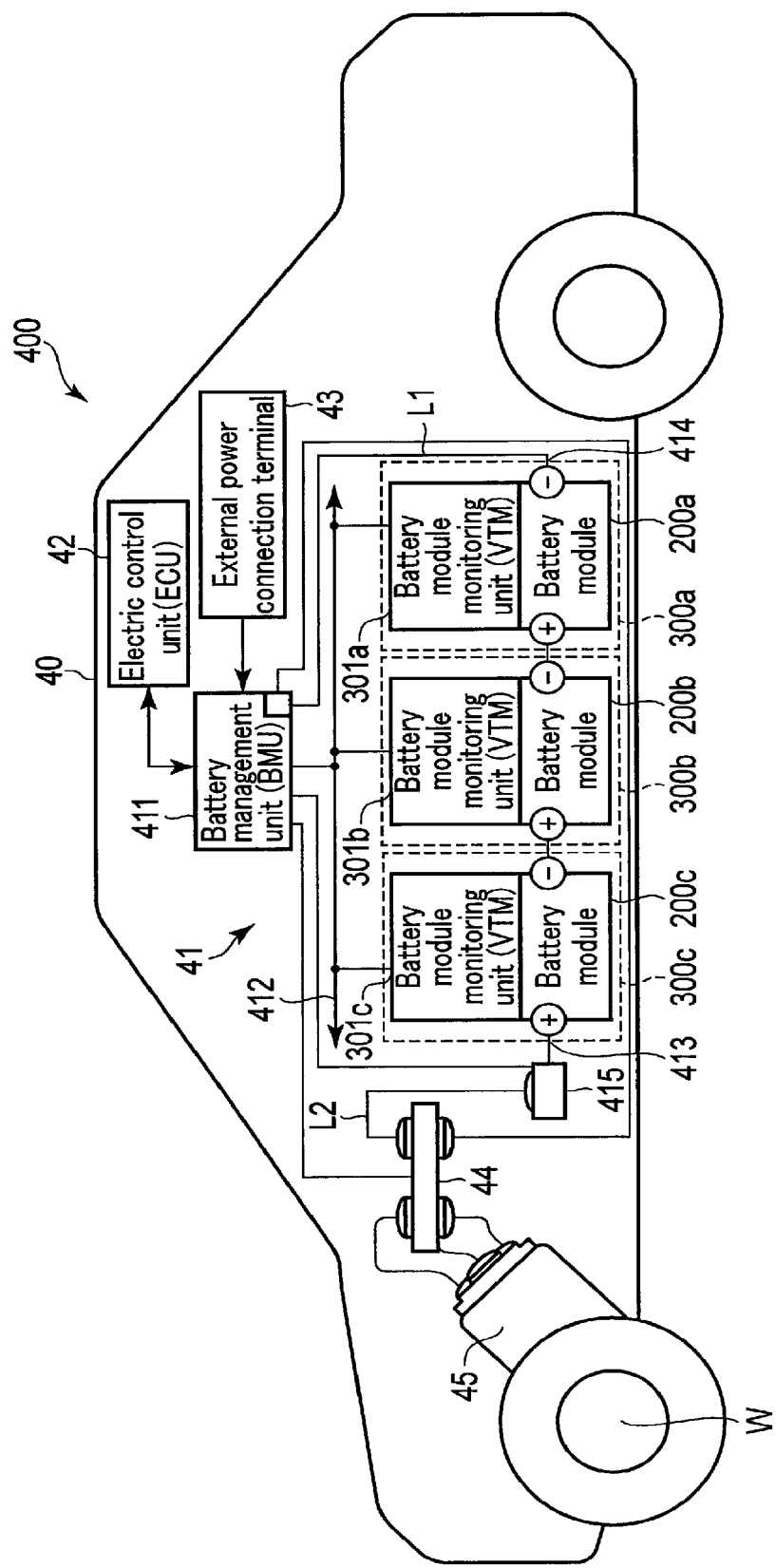
FIG. 10 is a view schematically showing another example of the vehicle according to the third embodiment.

Next, with reference to FIG. 10, an aspect of operation of the vehicle according to the embodiment is explained. FIG. 10 is a view schematically showing another example of the vehicle according to the embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 10) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

A vehicle according to the third embodiment includes the battery pack according to the second embodiment.

Therefore, according to the present embodiment, it is possible to provide the vehicle equipped with the battery pack capable of achieving the excellent charge-and-discharge property and the excellent cycle life performance.

EXAMPLES

Examples are explained below, but the embodiments are not limited to Examples described below.

Example 1

<Production of Positive Electrode>

A positive electrode was produced as described below.

Lithium-manganese oxide ($LiMn_2O_4$) having a spinel structure with an average particle size of 10 μm was used as a positive electrode active material, a graphite powder was used as a conductive agent, and polyvinylidene fluoride (PVdF) was used as a binder. The positive electrode active material, the conductive agent, and the binder were compounded in a ratio of 80% by weight, 10% by weight, and 10% by weight, respectively, and were dispersed in an N-methyl-2-pyrrolidone (NMP) solvent to prepare a slurry. The prepared slurry was coated on both surfaces of a 12 μm-thick Ti foil as a positive electrode current collector, and the coating film was dried to form a positive electrode active material-containing layer. A positive electrode having an electrode density of 3.0 g/cm³ was produced through a step of pressing the positive electrode current collector and the positive electrode active material-containing layer thereon.

<Production of Negative Electrode>

A negative electrode was produced as described below.

A $Li_4Ti_5O_{12}$ powder having an average secondary particle size (diameter) of 15 μm was used as a negative electrode active material, a graphite powder was used as a conductive agent, and PVdF was used as a binder. The negative electrode active material, the conductive agent, and the binder were compounded in a ratio of 80% by weight, 10% by weight, and 10% by weight, respectively, and were dispersed in an NMP solvent to prepare a slurry. The prepared slurry was coated on a 20 μm-thick Zn foil as a negative electrode current collector, and the coating film was dried to form a negative electrode active material-containing layer. A negative electrode having an electrode density of 2.0 g/cm³ was produced through a step of pressing the negative electrode current collector and the negative electrode active material-containing layer thereon.

<Production of Separator>

Glass solid electrolyte LATP ($Li_{1.5}Al_{0.5}Ti_{1.5}(PO_4)_3$) particles having an average particle size of 0.5 μm were prepared and these particles were compressed to prepare a sheet-shaped powder compact. The powder compact was fired at 1,100° C. for 12 hours to produce a separator having a thickness of 150 μm.

<Production of Electrode Group>

A laminate type electrode group was obtained by laminating the positive electrode produced as described above, the separator selectively permeable to monovalent cations, which was produced as described above, and the negative electrode produced as described above in this order. The electrode group was housed in a thin metal can formed from stainless steel having a thickness of 0.25 mm. The metal can had a valve for leaking a gas when the internal pressure became 2 atm or more.

<Measurement of Contact Angle of Principal Surface of Separator>

With respect to the produced sheet-shaped separator, the contact angle of the principal surface of the separator was measured by the method described in the first embodiment. On the first principal surface of the separator brought into contact with the negative electrode active material-containing layer, the contact angle θ1 with respect to the aqueous electrolyte was 110°. In addition, on the second principal surface of the separator brought into contact with the positive electrode active material-containing layer, the contact angle θ2 with respect to the aqueous electrolyte was 110°.

<Production of Secondary Battery and Charge-and-Discharge of First Cycle>

An electrolytic solution in which 12 M LiCl as an electrolyte salt was dissolved in 1 L of water was prepared, and the electrolytic solution was poured into the metal can to produce a secondary battery. The produced secondary battery was left for 24 hours in a 25° C. environment. After that, the battery was charged to 2.8 V at 1 A in a 25° C. environment and was then discharged to 1.6 V to check the capacity of the battery.

<Evaluation of Cycle>

In a 25° C. environment, after the battery was charged to 2.8 V at a constant current of 3 A, a pause time of 30 minutes was provided. Subsequently, the battery was discharged to 1.5 V at a constant current of 3 A, and a pause time of 30 minutes was provided again. A series of these operations was defined as one charge-and-discharge cycle. The charge-and-discharge cycle was repeated 50 times with respect to the produced secondary battery. The capacity at the fiftieth cycle with respect to the initial capacity, and the charge-discharge efficiency (discharge capacity/charge capacity) at the fiftieth cycle were calculated.

The above results are summarized in Table 1 and Table 2 below. In Table 1 and Table 2, conditions and results related to Examples 2 to 10 and Comparative Examples 1 to 3 described below are also described.

In Table 1, the "separator" column shows the material of the separator used. The "surface treatment" column shows the type of the treatment performed on the surface of the separator and the portion where the treatment was performed. The "type and concentration of electrolyte salt" column shows the type and concentration of the electrolyte salt contained in the aqueous electrolyte.

In Table 2, the "contact angle θ1" column shows the contact angle of the first principal surface (the surface brought into contact with the negative electrode) of the separator with respect to the aqueous electrolyte. The "contact angle θ2" column shows the contact angle of the second principal surface (the surface brought into contact with the positive electrode) of the separator with respect to the aqueous electrolyte. The "capacity retention ratio (%)" column shows the capacity (capacity retention ratio) after 50 cycles with respect to the initial capacity in percentage. The "charge-and-discharge efficiency (%)" column shows the discharge capacity with respect to the charge capacity at the fiftieth cycle in percentage.

Example 2

A secondary battery was produced in the same manner as described in Example 1, except that the produced separator was immersed in a hexamethyldisilazane solution and the whole surface of the separator was modified with a hydrophobic group, and a cycle test was performed thereon.

Example 3

A secondary battery was produced in the same manner as described in Example 1, except that the separator was formed from a glass solid electrolyte LAGP ($Li_{1.5}Al_{0.5}Ge_{1.5}(PO_4)_3$), and a cycle test was performed thereon.

Example 4

A secondary battery was produced in the same manner as described in Example 1, except that the separator was formed from a glass solid electrolyte LLZ ($Li_7La_3Zr_2O_{12}$), and a cycle test was performed thereon.

Example 5

A secondary battery was produced in the same manner as described in Example 1, except that the second principal surface (the principal surface brought into contact with the positive electrode) of the produced separator was polished to increase surface roughness, and a cycle test was performed thereon.

Example 6

A secondary battery was produced in the same manner as described in Example 1, except that a cation monovalent selective ion exchange membrane produced as described below was used as a separator, and a cycle test was performed thereon.

A resin was obtained by diluting a PVA-(b)-p-sodium styrenesulfonate block copolymer aqueous solution having a solid content concentration of 15% to a concentration of 10 wt %, and reprecipitating with methanol having a volume corresponding to that of the resin solution to remove salts. Subsequently, a required amount of distilled water was added to prepare an aqueous solution having a concentration of 15 wt %. This aqueous solution was poured into an acrylic cast plate having a length of 270 mm and a width of 210 mm to remove excess liquid and air bubbles and was then dried on a hot plate at 50° C. for 24 hours to produce a coating film.

The obtained membrane was heat-treated at 160° C. for 30 minutes to cause physical crosslinking. Subsequently, the membrane was immersed in an aqueous electrolyte solution of 2 mol/L sodium sulfate for 24 hours. After a concentrated sulfuric acid was added to the aqueous solution so that pH became 1, the membrane was immersed in 1.0% by volume of glutaraldehyde aqueous solution and was stirred with a stirrer at 25° C. for 24 hours to perform crosslinking treatment. Here, as the glutaraldehyde aqueous solution, a solution obtained by diluting "glutaraldehyde" (25% by volume) manufactured by Ishizu Pharmaceutical Co., Ltd., with water was used. After the crosslinking treatment, the membrane was immersed in deionized water and was immersed until the membrane reached the swelling equilibrium while exchanging deionized water several times during the course to obtain a cation exchange membrane.

Example 7

A secondary battery was produced in the same manner as described in Example 1, except that a polymer solid electrolyte membrane produced by the following method was used as a separator, and a cycle test was performed thereon.

A polyethylene oxide (PEO) powder having an average molecular weight of 40,000 was prepared, and a mixed solvent (volume ratio of 1:2) of propylene carbonate (PC) and diethyl carbonate (DEC), in which 1 M LiPF6 was dissolved, was added in 50% by weight based on the weight of the PEO powder. After stirring the obtained solution, the mixed solvent of the PC and the DEC was dried and removed to obtain a polymer solid electrolyte membrane containing the PEO with a thickness of 40 μm.

Example 8

A secondary battery was produced in the same manner as described in Example 1, except that lithium-cobalt oxide ($LiCoO_2$) was used as a positive electrode active material, and a cycle test was performed thereon.

Example 9

A secondary battery was produced in the same manner as described in Example 1, except that olivine lithium-iron phosphate ($LiFePO_4$) was used as a positive electrode active material, and a cycle test was performed thereon.

Example 10

A secondary battery was produced in the same manner as described in Example 1, except that anatase titanium oxide ($TiO_2$) was used as a negative electrode active material, and a cycle test was performed thereon.

Example 11

A secondary battery was produced in the same manner as described in Example 1, except that a niobium-titanium composite oxide ($Nb_2TiO_7$) was used as a negative electrode active material, and a cycle test was performed thereon.

Example 12

A secondary battery was produced in the same manner as described in Example 1, except that a sodium-niobium-titanium composite oxide ($Li_2Na_{1.8}Ti_{5.8}Nb_{0.2}O_{14}$) was used as a negative electrode active material, and a cycle test was performed thereon.

Example 13

A secondary battery was produced in the same manner as described in Example 1, except that a solution in which 10 M LiCl was dissolved in 1 L of water was used as an electrolytic solution, and a cycle test was performed thereon.

Example 14

A secondary battery was produced in the same manner as described in Example 1, except that a solution in which 9 M LiCl was dissolved in 1 L of water was used as an electrolytic solution, and a cycle test was performed thereon.

Example 15

A secondary battery was produced in the same manner as described in Example 1, except that a solution in which 6 M LiCl was dissolved in 1 L of water was used as an electrolytic solution, and a cycle test was performed thereon.

Example 16

First, a stacked electrode group was produced in the same manner as described in Example 1. Subsequently, a first electrolytic solution in which 12 M LiCl was dissolved in 1 L of water and a second electrolytic solution in which 2M $Li_2SO_4$ was dissolved in 1 L of water were prepared.

Subsequently, the electrode group was housed in a thin metal can so that the separator devided the internal space of the metal can into the two spaces. One space is the space of the positive electrode side. The other space is the space of the negative electrode side. The metal can was a metal can made of stainless steel having a thickness of 0.25 mm.

The second electrolytic solution was poured into the space of the positive electrode side and the first electrolytic solution was poured into the space of the negative electrode side to produce a secondary battery. At this time, the first electrolytic solution was in contact with the first principal surface of the separator, and the second electrolytic solution was in contact with the second principal surface of the separator. The obtained secondary battery was schematically a secondary battery having a structure shown in FIG. 11.

FIG. 11 is a plan view schematically showing an example of the secondary batteries according to the embodiment. The secondary battery shown in FIG. 11 has the same structure as the secondary battery shown in FIG. 1, except that the separator 4 separated the space of the positive electrode side from the space of the negative electrode side in the metal can. Therefore, descriptions of members already provided with reference to FIG. 1 are omitted.

The measurement of the contact angle of the principal surface of the separator and the cycle test were performed on the obtained secondary battery in the same manner as described in Example 1.

Example 17

First, a stacked electrode group was produced in the same manner as described in Example 1. Subsequently, a first electrolytic solution in which 12 M LiCl was dissolved in 1 L of water and a second electrolytic solution in which 9 M LiCl was dissolved in 1 L of water were prepared.

The electrode group was housed in a thin metal can so that the separator divided the internal space of the metal can into the two spaces. One space is the space of the positive electrode side. The other space is the space of the negative electrode side. The metal can was a metal can made of stainless steel having a thickness of 0.25 mm.

The second electrolytic solution was poured into the space on the positive electrode side and the first electrolytic solution was poured into the space on the negative electrode side to produce a secondary battery. At this time, the first electrolytic solution was in contact with the first principal surface of the separator, and the second electrolytic solution was in contact with the second principal surface of the separator. The obtained secondary battery was schematically a secondary battery having a structure shown in FIG. 11.

The measurement of the contact angle of the principal surface of the separator and the cycle test were performed on the obtained secondary battery in the same manner as described in Example 1.

The results of these Examples 13 to 17 are summarized in Tables 3 and 4 below. The meanings of the items described in Tables 3 and 4 have the same meanings as described in Tables 1 and 2.

Comparative Example 1

A secondary battery was produced in the same manner as described in Example 1, except that hydrophilization treatment was performed by coating titanium oxide on the first principal surface (the principal surface brought into contact with the negative electrode) of the produced separator, and a cycle test was performed thereon.

Comparative Example 2

A secondary battery was produced in the same manner as described in Example 1, except that a solution in which 5 M LiTFSI was dissolved in 1 L of water was used as an electrolytic solution, and a cycle test was performed thereon.

Comparative Example 3

A secondary battery was produced in the same manner as described in Example 1, except that a polyethylene porous film was interposed between the separator and the negative electrode, and a cycle test was performed thereon. In this secondary battery, the separator and the negative electrode were not in contact with each other, but the negative electrode and the polyethylene porous film were in contact with each other. The value of the contact angle θ1 according to Comparative Example 3 in Table 1 is not the contact angle of the first principal surface of the separator with respect to the aqueous electrolyte but the contact angle of the principal surface of the polyethylene porous film with respect to the aqueous electrolyte. In addition, the value of the contact angle θ2 according to Comparative Example 3 in Table 1 is the contact angle of the second principal surface of the separator with respect to the aqueous electrolyte.

TABLE 1

|  | Positive Electrode Active Material | Negative Electrode Active Material | Separator | Surface Treatment | Type and Concentration of Electrolyte Salt |
|---|---|---|---|---|---|
| Example 1 | $LiMn_2O_4$ | $Li_4Ti_5O_{12}$ | $Li_{1.5}Al_{0.5}Ti_{1.5}(PO_4)_3$ | — | LiCl 12M |
| Example 2 | $LiMn_2O_4$ | $Li_4Ti_5O_{12}$ | $Li_{1.5}Al_{0.5}Ti_{1.5}(PO_4)_3$ | Hydrophobic treatment of whole separator | LiCl 12M |
| Example 3 | $LiMn_2O_4$ | $Li_4Ti_5O_{12}$ | $Li_{1.5}Al_{0.5}Ge_{1.5}(PO_4)_3$ | — | LiCl 12M |
| Example 4 | $LiMn_2O_4$ | $Li_4Ti_5O_{12}$ | $Li_7La_3Zr_2O_{12}$ | — | LiCl 12M |
| Example 5 | $LiMn_2O_4$ | $Li_4Ti_5O_{12}$ | $Li_{1.5}Al_{0.5}Ti_{1.5}(PO_4)_3$ | Polishing of second principal surface | LiCl 12M |
| Example 6 | $LiMn_2O_4$ | $Li_4Ti_5O_{12}$ | Ion exchange membrane selectively permeable to monovalent cations | — | LiCl 12M |
| Example 7 | $LiMn_2O_4$ | $Li_4Ti_5O_{12}$ | Polymer type solid electrolyte | — | LiCl 12M |
| Example 8 | $LiCoO_2$ | $Li_4Ti_5O_{12}$ | $Li_{1.5}Al_{0.5}Ti_{1.5}(PO_4)_3$ | — | LiCl 12M |
| Example 9 | $LiFePO_4$ | $Li_4Ti_5O_{12}$ | $Li_{1.5}Al_{0.5}Ti_{1.5}(PO_4)_3$ | — | LiCl 12M |
| Example 10 | $LiMn_2O_4$ | $TiO_2$ | $Li_{1.5}Al_{0.5}Ti_{1.5}(PO_4)_3$ | — | LiCl 12M |
| Example 11 | $LiMn_2O_4$ | $Nb_2TiO_7$ | $Li_{1.5}Al_{0.5}Ti_{1.5}(PO_4)_3$ | — | LiCl 12M |
| Example 12 | $LiMn_2O_4$ | $Li_2Na_{1.8}Ti_{5.8}Nb_{0.2}O_{14}$ | $Li_{1.5}Al_{0.5}Ti_{1.5}(PO_4)_3$ | — | LiCl 12M |
| Comparative Example 1 | $LiMn_2O_4$ | $Li_4Ti_5O_{12}$ | $Li_{1.5}Al_{0.5}Ti_{1.5}(PO_4)_3$ | Hydrophilic treatment of first principal surface | LiCl 12M |
| Comparative Example 2 | $LiMn_2O_4$ | $Li_4Ti_5O_{12}$ | $Li_{1.5}Al_{0.5}Ti_{1.5}(PO_4)_3$ | — | LiTFSI 5M |
| Comparative Example 3 | $LiMn_2O_4$ | $Li_4Ti_5O_{12}$ | $Li_{1.5}Al_{0.5}Ti_{1.5}(PO_4)_3$ | — | LiCl 12M |

TABLE 2

|  | Contact Angle θ1 (°) | Contact Angle θ2 (°) | Capacity Retention Ratio (%) | Charge-and-Discharge Efficiency (%) |
|---|---|---|---|---|
| Example 1 | 110 | 110 | 95 | 94 |
| Example 2 | 150 | 150 | 97 | 95 |
| Example 3 | 124 | 124 | 97 | 95 |
| Example 4 | 106 | 106 | 96 | 94 |
| Example 5 | 110 | 60 | 98 | 96 |
| Example 6 | 98 | 98 | 92 | 91 |
| Example 7 | 103 | 103 | 92 | 93 |
| Example 8 | 110 | 110 | 93 | 94 |
| Example 9 | 110 | 110 | 96 | 96 |
| Example 10 | 110 | 110 | 96 | 98 |
| Example 11 | 110 | 110 | 94 | 94 |
| Example 12 | 110 | 110 | 95 | 98 |
| Comparative Example 1 | 10 | 110 | 50 | 51 |
| Comparative Example 2 | 30 | 30 | 46 | 32 |
| Comparative Example 3 | 40 | 100 | 57 | 59 |

TABLE 3

|  | Positive Electrode Active Material | Negative Electrode Active Material | Separator | Surface Treatment | Type and Concentration of Electrolyte Salt |
|---|---|---|---|---|---|
| Example 13 | $LiMn_2O_4$ | $Li_4Ti_5O_{12}$ | $Li_{1.5}Al_{0.5}Ti_{1.5}(PO_4)_3$ | — | LiCl 10M |
| Example 14 | $LiMn_2O_4$ | $Li_4Ti_5O_{12}$ | $Li_{1.5}Al_{0.5}Ti_{1.5}(PO_4)_3$ | — | LiCl 9M |
| Example 15 | $LiMn_2O_4$ | $Li_4Ti_5O_{12}$ | $Li_{1.5}Al_{0.5}Ti_{1.5}(PO_4)_3$ | — | LiCl 6M |
| Example 16 | $LiMn_2O_4$ | $Li_4Ti_5O_{12}$ | $Li_{1.5}Al_{0.5}Ti_{1.5}(PO_4)_3$ | — | LiCl 12M/ $La_2SO_4$ 2M |
| Example 17 | $LiMn_2O_4$ | $Li_4Ti_5O_{12}$ | $Li_{1.5}Al_{0.5}Ti_{1.5}(PO_4)_3$ | — | LiCl 12M/ LiCl 9M |

TABLE 4

|  | Contact Angle θ1 (°) | Contact Angle θ2 (°) | Capacity Retention Ratio (%) | Charge-and-Discharge Efficiency (%) |
|---|---|---|---|---|
| Example 13 | 108 | 108 | 93 | 93 |
| Example 14 | 101 | 101 | 95 | 91 |
| Example 15 | 92 | 92 | 94 | 85 |
| Example 16 | 110 | 20 | 96 | 95 |
| Example 17 | 110 | 101 | 95 | 94 |

From Table 1 to Table 4, the followings can be seen.

As shown in Examples 1 to 10, when the contact angle θ1 of the first principal surface of the separator is 90°≤θ1<180°, the capacity retention ratio and the charge-and-discharge efficiency are excellent.

From comparison between Example 1 and Example 2, it is found that when the contact angle θ1 and the contact angle θ2 are equal to each other, Example 2 having a larger contact angle θ1 due to the modification of the whole separator with a hydrophobic group is excellent in terms of both the capacity retention ratio and the charge-and-discharge efficiency.

From comparison between Example 1 and Example 5, it is found that the capacity retention ratio and the charge-and-discharge efficiency are remarkably excellent when the contact angle θ2 is 10°≤θ2<90°.

From Examples 8 to 10, it is found that even when the positive electrode active material and the negative electrode active material are changed, the excellent capacity retention ratio and the excellent charge-and-discharge efficiency are exhibited.

By performing the hydrophilic treatment on the first principal surface of the separator, Comparative Example 1 in which the contact angle θ1 was less than 90° was inferior in the capacity retention ratio and the charge-and-discharge efficiency.

In Comparative Example 2 using an electrolytic solution containing LiTFSI as the aqueous electrolytic solution, the contact angles θ1 and θ2 were 30°, and the capacity retention ratio and the charge-and-discharge efficiency were inferior.

In Comparative Example 3 in which the first principal surface of the separator and the negative electrode active material-containing layer were not in contact with each other, the capacity retention ratio and the charge-and-discharge efficiency were inferior.

From Example 1 and Examples 13 to 15, it is found that even when the concentration of the electrolyte salt is changed, excellent charge-and-discharge property and cycle life performance can be achieved when the contact angle θ1 is 90° or more.

As shown in Examples 16 and 17, it is found that even when the electrolytic solution in contact with the first principal (negative electrode side) of the separator and the electrolytic solution in contact with the second principal surface (positive electrode side) of the separator are different from each other, excellent charge-and-discharge property and cycle life performance can be achieved.

According to at least one embodiment and Example described above, a separator is provided. The separator is selectively permeable to monovalent cations and includes a first surface and a second surface which is a reverse surface to the first surface. A contact angle θ1 of the first surface with respect to an aqueous electrolyte is different from a contact angle θ2 of the second surface with respect to the aqueous electrolyte. Therefore, the separator can improve charge-and-discharge property and cycle life performance of electronic devices such as secondary batteries and capacitors.

Also, according to at least one embodiment and Example described above, a secondary battery is provided. The secondary battery includes a positive electrode, a negative electrode including a negative electrode active material-containing layer, an aqueous electrolyte, and a separator selectively permeable to monovalent cations. The separator includes a first principal surface facing the negative electrode active material-containing layer and a second principal surface. A contact angle θ1 of the first principal surface with respect to the aqueous electrolyte is 90°≤σ1<180°. Therefore, it is possible to suppress the electrolysis of water by locally reducing the amount of water molecules in the vicinity of the negative electrode. Therefore, it is possible to obtain a secondary battery which is excellent in terms of the charge-and-discharge property and the cycle life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a positive electrode;
a negative electrode comprising a negative electrode active material-containing layer;
an aqueous electrolyte; and
a separator, the separator being selectively permeable to monovalent cations, not substantially permeable to anions, and comprising a first principal surface, a second principal surface, and at least one selected from the group consisting of an oxide type solid electrolyte, a polymer type solid electrolyte, a glass electrolyte, and a lithium ion exchange membrane,
wherein
at least a part of the first principal surface faces the negative electrode active material-containing layer,
a contact angle θ1 of the first principal surface with respect to the aqueous electrolyte is 90°≤θ1<180°,
the positive electrode comprises a positive electrode active material-containing layer,
the second principal surface is in contact with the positive electrode active material-containing layer, and
the contact angle θ1 is larger than a contact angle θ2 of the second principal surface with respect to the aqueous electrolyte.

2. The secondary battery according to claim 1, wherein a whole principal surface of the negative electrode active material-containing layer is in contact with the first principal surface of the separator.

3. The secondary battery according to claim 1, wherein the contact angle θ2 is 10°≤θ2<90°.

4. The secondary battery according to claim 1, wherein the first principal surface comprises a hydrophobic group.

5. The secondary battery according to claim 1, wherein the separator comprises at least one selected from the group consisting of a glass electrolyte and a lithium ion exchange membrane.

6. The secondary battery according to claim 5, wherein the separator is formed from a glass electrolyte.

7. The secondary battery according to claim 1, wherein the aqueous electrolyte comprises at least one selected from a chloride ion ($Cl^-$), a hydroxide ion ($OH^-$), a sulfate ion ($SO_4^{2-}$), a nitrate ion ($NO_3^-$), and an acetate ion ($CH_3COO^-$).

8. A battery pack comprising the secondary battery according to claim 1.

9. The battery pack according to claim 8, further comprising an external power distribution terminal and a protective circuit.

10. The battery pack according to claim 8, comprising plural of secondary batteries, wherein the secondary batteries are electrically connected in series, in parallel, or in combination of series connection and parallel connection.

11. A vehicle comprising the battery pack according to claim 8.

12. The vehicle according to claim 11, which comprises a mechanism configured to convert kinetic energy of the vehicle into regenerative energy.

13. The secondary battery according to claim 1, wherein the separator is formed from an oxide type solid electrolyte.

14. The secondary battery according to claim 1, wherein the separator is formed from a polymer type solid electrolyte.

15. The secondary battery according to claim 1, wherein the separator is formed from a lithium ion exchange membrane.

16. The secondary battery according to claim 1, wherein the at least a part of the first principal surface is in direct contact with the negative electrode active material-containing layer.

* * * * *